(12) United States Patent
Mitsui

(10) Patent No.: US 7,268,460 B2
(45) Date of Patent: Sep. 11, 2007

(54) DIFFERENT MATERIALS-LAMINATE METAL PLATE AND DIFFERENT MATERIALS-LAMINATE CORE, AND METHOD OF PRODUCING THE SAME

(75) Inventor: Yoshiaki Mitsui, Fukuoka (JP)

(73) Assignee: Mitsui High-tec, Inc., Fukuoka (JP)

( * ) Notice: Subject to any disclaimer, the term of this patent is extended or adjusted under 35 U.S.C. 154(b) by 171 days.

(21) Appl. No.: 10/504,097

(22) PCT Filed: Feb. 10, 2003

(86) PCT No.: PCT/JP03/01376

§ 371 (c)(1),
(2), (4) Date: Aug. 10, 2004

(87) PCT Pub. No.: WO03/068497

PCT Pub. Date: Aug. 21, 2003

(65) Prior Publication Data

US 2005/0077798 A1    Apr. 14, 2005

(30) Foreign Application Priority Data

Feb. 12, 2002 (JP) ............................. 2002-033971
Feb. 18, 2002 (JP) ............................. 2002-040497

(51) Int. Cl.
*H02K 1/06* (2006.01)
(52) U.S. Cl. .................................................... 310/217
(58) Field of Classification Search ................ 310/216, 310/217, 218
See application file for complete search history.

(56) References Cited

U.S. PATENT DOCUMENTS 4,578,853 A * 4/1986 Wurth .......................... 29/598
5,420,471 A * 5/1995 Yun ............................ 310/216
6,525,444 B2 * 2/2003 Salem et al. ................ 310/216

FOREIGN PATENT DOCUMENTS

| JP | 06-169557 A | 6/1994 |
| JP | 09-215279 A | 8/1997 |
| JP | 2001-298916 A | 10/2001 |

* cited by examiner

*Primary Examiner*—Dang Le
*Assistant Examiner*—Nguyen N. Hanh
(74) *Attorney, Agent, or Firm*—Wood, Phillips, Katz, Clark & Mortimer

(57) ABSTRACT

The invention is to provide a metal plate of laminated heterogeneous materials, and an iron core of the same, where a plurality of metal plates of different material qualities are easily and stably joined, have characteristics over many applications, may attain low production cost, and provide a making method thereof. That is, a metal plate of laminated heterogeneous materials, which is joined by laminating a plurality of metal plates of different material qualities, is joined by caulking a first material body of the metal plate of the laminated heterogeneous materials having notches at intermediate parts thereof, as well as caulking projections formed by cutting down rows of both ends thereof in the length direction of the notches, and a second material body of the metal plate of the laminated heterogeneous materials formed with caulking holes for inserting the caulking projections, at the caulking projections of said first material body and the caulking holes of the second material body.

16 Claims, 26 Drawing Sheets

ENLARGED CROSS SECTIONAL VIEW ALONG D-D LINE

CROSS SECTIONAL VIEW ALONG B-B LINE

CROSS SECTIONAL VIEW ALONG B-B LINE

DIFFERENT MATERIALS-LAMINATE METAL PLATE AND DIFFERENT MATERIALS-LAMINATE CORE, AND METHOD OF PRODUCING THE SAME

TECHNICAL FIELD

The present invention relates to a metal plate of laminated heterogeneous materials and a core of laminated heterogeneous materials, which are composed by laminating and metal-joining a plurality of metal plates of different material qualities one another, and a making method thereof.

BACKGROUND ART

When making iron cores, or transformers of rotors equipped in motors, those have conventionally been pursued to have preferable magnetic characteristics such as high permeability or small holding power, and less iron loss.

Therefore, for avoiding generation of Joule heat caused by eddy currents as a main cause of the iron loss and generation of magnetic force in a counteracting direction, aiming at interception of the eddy current flow, it is considered to reduce in thickness an electromagnetic steel plate having good magnetic characteristic, and laminate plural sheets of thinned steel plates for producing iron cores or transformers of rotors.

In the above mentioned production, if there would exist a metal material which has superior characteristics concerned with permeability, iron loss, workability, strength characteristic, or corrosion resistance, such a metal material were very useful, but actually there does not exist one metal plate which would be excellent in various kinds of characteristics.

For example, an amorphous property has a very superior magnetic characteristic such as high permeability or low iron loss, but this is poor in the workability and hard to be formed.

The electromagnetic steel plate does not have the magnetic characteristic as the amorphous property, but is more excellent in the workability than the amorphous property.

A low carbon steel plate is inferior in the magnetic characteristics to the electromagnetic steel plate, but superior in the workability, cheap, and advantageous to cost down.

An electromagnetic soft steel plate is inferior in iron loss to the electromagnetic steel plate, but superior in the workability.

As mentioned above, individual metal plates have respective characteristics, but also have poor characteristics.

As a metal material composed by joining and laminating heterogeneous metal plates, there is a clad steel.

The clad steel is produced, for example, by metal-joining stainless steels to the upper surface and the rear surface of an intermediate layer of an ultra low carbon steel, or metal-joining a permalloy to the lower layer and the upper layer of the intermediate layer of the stainless steel, and the clad steel has many characteristics.

As methods of making one body by joining the laminated metal plates other than the above mentioned clad steel, such measures have been practiced as an embossing process, bondage by an bonding agent, or temporarily holding by rivets, said embossing process forming dotted concaves and dotted convexes in the metal plates and fitting the concaves and convexes.

However, in case of producing the laminated iron core of the motor, if the metal plates have thin thickness, a punching process of the iron core pieces increases for providing the laminated core of a desired laminated thickness, so that productivity lowers.

Then, for heightening the punching productivity, it is assumed to carry out punching through the laminated thin metal plates, but, for example, since the amorphous plate is inferior in the workability, if punching through the laminated thin metal plates, cracks or breakages are caused.

On the other hand, the clad steel necessitates heating at high temperatures and fuse-bonding treatment for metal-joining heterogeneous metals, considerable energy and labor are taken for the production, and high cost is invited.

Further, in the embossing process, a caulking strength by the concave and convex parts of the metal plates to be joined is weak, and might probably come off during processing or transportation.

Bonding by an bonding agent might be exfoliated by expansion of an air remaining between the metal plates to be bonded, impurities adhered to the bonded faces, or weak bonding force, and cost is high.

The joining by the rivets has a problem that parts of the rivets exist as the convexes on an opposite side of the jointed face of the metal plate, and if the convexes contact another metal plate, this metal plate takes scratches.

In view of the above mentioned actual circumstances, it is accordingly an object of the invention to provide a metal plate of laminated heterogeneous materials, and an iron core of laminated heterogeneous materials where a plurality of metal plates of different material qualities are easily and stably joined, have characteristics over many applications, and may attain low production cost, and provide a making method thereof.

DISCLOSURE OF INVENTION

The subject matters of the metal plate of laminated heterogeneous materials, the core of laminated heterogeneous materials, and the making method thereof which solve the above mentioned problems, are present in the following (1) to (14).

(1) A metal plate of laminated heterogeneous materials, which is joined by laminating a plurality of metal plates of different material qualities, is characterized by caulking a first material body of the metal plate of the laminated heterogeneous materials having notches at intermediate parts thereof, as well as caulking projections formed by cutting down rows of both ends thereof in the length direction of the notches, a second material body of the metal plate of the laminated heterogeneous materials formed with caulking holes for inserting the caulking projections, at the caulking projections of said first material body of the metal plate of laminated heterogeneous materials and the caulking holes of the second material body of the metal plate of the laminated heterogeneous materials.

(2) A metal plate of laminated heterogeneous materials, which is joined by laminating a plurality of metal plates of different material qualities, characterized by caulking a first material body of the metal plate of the heterogeneous materials laminated by holding metal plates of harder workability than those of upper and lower sided metal plates therebetween, and formed with caulking projections having notches at intermediate parts thereof and formed by cutting down rows of both ends thereof in the length direction of the notches, and a second material body of the metal plate of the laminated heterogeneous materials formed by laminating metal plates of harder workability than that of at least one of the lower and upper side metal plates and formed with caulking holes for inserting the caulking projections, at the caulking projections of said first material body of the metal plate of laminated heterogeneous materials and the caulking holes of the second material body of the metal plate of the laminated heterogeneous materials.

(3) A metal plate of laminated heterogeneous materials is characterized in that the caulking projections are cut down along the rows of both ends thereof in the length direction of the notches.

(4) A metal plate of laminated heterogeneous materials is characterized in that the caulking projections are cut down along the rows exceeding both ends thereof in the length direction of the notches.

(5) A metal plate of laminated heterogeneous materials is characterized in that the metal plate of hard workability is an amorphous plate, and the lower and upper side metal plates are an electromagnetic steel plate, low carbon steel plate, electromagnetic soft iron plate, Fe—Ni alloy plate, or copper plate.

(6) An iron core of laminated heterogeneous materials is composed in that iron core pieces of laminated heterogeneous materials are laminated until a desired thickness via caulking parts, said iron core pieces being punched from the plates of laminated heterogeneous materials formed by holding high magnetic materials of hard workability inferior in workability to lower and upper sided plate materials therebetween, and said caulking parts having notching holes at the center thereof and being formed by cutting down both sides in the length direction of the notching holes.

(7) An iron core of laminated heterogeneous materials is characterized in that the caulking parts have catching holes formed in the iron core piece of the laminated heterogeneous materials of a lowermost layer, and caulking projections and caulking concaves formed in the iron core piece of the laminated heterogeneous materials laminated on the iron core piece of said lowermost layer, and the caulking projections and the caulking concaves are formed by cutting down both sides in the length direction of the notching holes formed in the intermediate positions of predetermined parts to be caulked corresponding to said catching holes.

(8) An iron core of laminated heterogeneous materials is characterized in that the notching holes are formed until both edges of the predetermined parts to be caulked.

(9) An iron core of laminated heterogeneous materials is characterized in that the notching holes are formed by leaving end parts of a desired length until both edges of the predetermined parts to be caulked.

(10) An iron core of laminated heterogeneous materials is characterized in that the high magnetic material of hard workability is the amorphous plate.

(11) An iron core of laminated heterogeneous materials is characterized in that the plate material is the electromagnetic steel plate, low carbon steel plate, electromagnetic soft iron plate, Fe—Ni alloy plate, or copper plate.

(12) A method of making a metal plate of laminated heterogeneous materials composed by laminating and joining a plurality of metal plates of different material qualities, is characterized by comprising a process of laminating, on a first material body of a metal plate of laminated heterogeneous materials formed with caulking holes for fitting caulking projections, a second material body of the metal plate of laminated heterogeneous materials formed with notches in intermediate parts in places corresponding to the caulking holes, and a process of pressing by a caulking punch from the upper part of the second metal plate body, thereby to cut down both end sides in the length direction of the notch, so as to form a projection fitting into the caulking holes.

(13) A method of making a metal plate of laminated heterogeneous materials is characterized in that the first and second metal plates hold at least one of the upper and lower metal plates of hard workability between metal plates of different material qualities.

(14) A method of making a metal plate of laminated heterogeneous materials is characterized in that the process of pushing by the caulking punch is exerted in rows exceeding both ends in the length direction of notch.

According to the above mentioned structure (1), when joining the plurality of laminated metal plates of different material qualities, the present structure caulks to join the first material body of the metal plate of the laminated heterogeneous materials having notches at intermediate parts thereof as well as caulking projections formed by cutting down rows of both ends thereof in the length direction of the notches, the second material body of the metal plate of the laminated heterogeneous materials formed with caulking holes for inserting the caulking projections, at the caulking projections of said first material body of the metal plate of laminated heterogeneous materials and the caulking holes of the second material body of the metal plate of the laminated heterogeneous materials, and therefore, the plurality of metal plates of different material qualities can be easily and stably joined.

According to the above mentioned structure (2), when joining the plurality of laminated metal plates of different material qualities, the present structure caulks to join a first material body of the metal plate of the heterogeneous materials laminated by holding metal plates of harder workability than those of upper and lower sided metal plates therebetween, and formed with caulking projections having notches at intermediate parts thereof and formed by cutting down rows of both ends thereof in the length direction of the notches, and a second material body of the metal plate of the laminated heterogeneous materials formed by laminating metal plates of harder workability than that of at least one of the lower and upper side metal plates and formed with caulking holes for inserting the caulking projections, at the caulking projections of said first material body of the metal plate of laminated heterogeneous materials and the caulking holes of the second material body of the metal plate of the laminated heterogeneous materials, and therefore, although the process of forming the notches or caulking holes is difficult to practice in the sole metal plate of hard workability, this process may be securely and easily exerted with this structure.

According to the above mentioned structure (3), the caulking projections are cut down along the rows of both ends thereof in the length direction of the notches, and therefore, the caulking projections can be deeply cut down to obtain the long fitting parts of the caulk, and the cut down parts are less to reduce the plate thickness and width, so that the joint can be made firm in the metal plate of laminated heterogeneous materials.

According to the above mentioned structure (4), the caulking projections are cut down along the rows exceeding both ends thereof in the length direction of the notches, and therefore, the caulking projections can be deeply cut down to obtain the long fitting parts of the caulk, and at the same time, the cut down caulking projection has, on the bottom, linked parts at the left and right sides, so that the joint can be made firmer in the metal plate of laminated heterogeneous materials.

According to the above mentioned structure (5), the metal plate of hard workability is the amorphous plate, and the lower and upper side metal plates are an electromagnetic steel plate, low carbon steel plate, electromagnetic soft iron plate, Fe—Ni alloy plate, or copper plate, and therefore, such a metal plate of laminated heterogeneous materials is available which has the characteristic owned by the amorphous plate as well as the characteristics of the metal plates respectively associated, and supplemented with the workability of the amorphous plate.

According to the above mentioned structure (6), the iron core pieces of laminated heterogeneous materials are laminated until a desired thickness via the caulking parts, said iron core pieces being punched from the plates of laminated heterogeneous materials formed by holding the high magnetic materials of hard workability inferior in workability to the lower and upper sided plate materials therebetween, and said caulking parts having notching holes at the center thereof and being formed by cutting down both sides in the length direction of the notching holes, and therefore, it is possible to provide the cores with the high caulking strength and of the laminated shape.

Further, the iron core pieces are produced by punching the plates of laminated heterogeneous materials formed by holding the high magnetic materials of hard workability inferior in workability to the lower and upper sided plate materials therebetween, and therefore, the punching and the forming of the caulking parts can be easily carried out even if the high magnetic material is poor in workability and the individual plate materials and the high magnetic materials of hard workability have thin thickness, whereby stable caulk-catching parts may be formed maintaining the caulking strength.

According to the above mentioned structure (7), the caulking parts have catching holes formed in the iron core piece of the laminated heterogeneous materials of a lowermost layer, and caulking projections and caulking concaves formed in the iron core piece of the laminated heterogeneous materials laminated on the iron core piece of said lowermost layer, and the caulking projections and the caulking concaves are formed by cutting down both sides in the length direction of the notching holes formed in the intermediate positions of predetermined parts to be caulked corresponding to said catching holes, and therefore, the long caulk-catching parts may be formed in the caulking projections and the caulking holes.

According to the above mentioned structure (8), the notching holes are formed until both edges of the predetermined parts to be caulked, and therefore, the caulking projections do not reduce in the plate thickness and width but remain as when starting the cutting-down, and the more stable caulk-catching parts may be formed, maintaining the caulking strength.

According to the above mentioned structure (9), the notching holes are formed, leaving end parts of a desired length until both edges of the predetermined parts to be caulked, and the caulking projections are deeply cut down, and the caulk-fitting parts can be taken long by cutting down the rows exceeding both ends in the length direction of the notches, and at the same time, the cut down caulking projection has, on the bottom, linked parts at the left and right sides, so that the joint can be made firmer in the metal plate of laminated heterogeneous materials.

According to the above mentioned structure (10), the high magnetic material of hard workability is characterized in that the high magnetic material is the amorphous plate. It is possible to make the best of the characteristics that the magnetic characteristics such as the high permeability or the low iron loss owned by the amorphous plate are very excellent but the permeability is inferior and the forming is difficult.

According to the above mentioned structure (11), the plate material is the electromagnetic steel plate, low carbon steel plate, electromagnetic soft iron plate, Fe—Ni alloy plate, or copper plate, and it is possible to make the best of the characteristics of the respective metal plates.

According to the above mentioned structure (12), the method of making a metal plate of laminated heterogeneous materials composed by laminating and joining a plurality of metal plates of different material qualities, comprises a process of laminating, on a first material body of a metal plate of laminated heterogeneous materials formed with caulking holes for fitting caulking projections, a second material body of the metal plate of laminated heterogeneous materials formed with notches in intermediate parts in places corresponding to the caulking holes, and a process of pressing by a caulking punch from the upper part of the second metal plate body, thereby to cut down both end sides in the length direction of the notch, so as to form a projection fitting into the caulking holes, and therefore, the notching holes are in advance formed at the intermediate positions of the predetermined caulking parts, and then the caulking work can be executed, so that the long caulk-catching parts can be formed in the caulking projections and the caulking holes.

According to the abovementioned structure (13), the first and second metal plates hold at least one of the upper and lower metal plates of hard workability between metal plates of different material qualities, and therefore, although the process of forming the notches or caulking holes is difficult to practice in the sole metal plate of hard workability, this process may be securely and easily exerted with this structure.

According to the above mentioned structure (14), the process of pushing by the caulking punch is exerted in rows exceeding both ends in the length direction of notch, and therefore, the caulking projections are cut down along the rows exceeding both ends thereof in the length direction of the notches, so that the caulking projections can be deeply cut down to obtain the long fitting parts of the caulk, and at the same time, the cut down caulking projection has, on the bottom, linked parts at the left and right sides, and the joint can be made firmer in the metal plate of laminated heterogeneous materials.

BRIEF DESCRIPTION OF DRAWINGS

In FIGS. 1 to 18, reference numeral 1 designates the metal plate of laminated heterogeneous materials, numerals 21, 22 designate the electromagnetic steel plates (metal plate materials of the upper side), 22, 22 are the electromagnetic steel plates (metal plate materials of the lower side), 23, 22 are the electromagnetic steel plates (metal plate materials), 31, 231 are the amorphous plates (metal plate materials of hard workability), 32, 232 are the amorphous plates (metal plate materials), 1A, 21A are the upper layer parts of the metal plates of laminated heterogeneous materials (one-sided metal plate bodies of laminated heterogeneous materials), and 1B, 21B are the lower layer parts of the metal plate of laminated heterogeneous materials (another-sided metal plate bodies).

Figure 1:
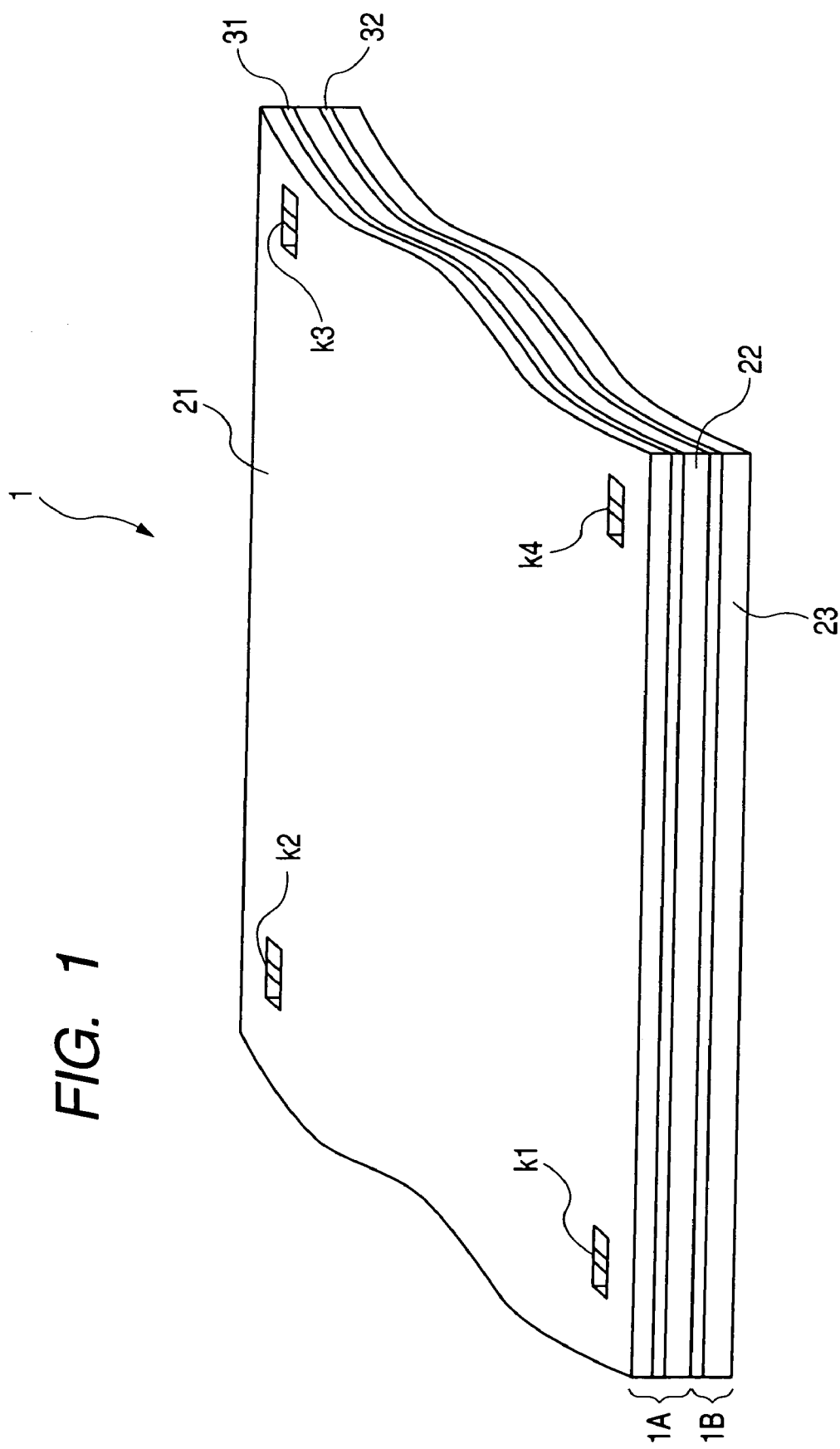
FIG. 1 is a perspective view showing the metal plate of laminated heterogeneous materials of a first embodiment according to the invention.

Further, kh i 0 (kh10, kh20, kh30, kh40) are end parts (rows of both end sides, and rows of both ends in the length direction of notch), kh2 i (kh210, kh220, kh230, kh240) are parts exceeding both ends in the length direction of notch (rows of both end sides, and rows exceeding both ends in the length direction of notch), kh i (k h1, k h2, k h3, k h4) and kh2 i (k h21, k h22, k h23, k h24) are notches, k m i (k m 1, k m 2, k m 3, k m 4), and k m 2 i (k m 21, k m 22, k m 23, k m 24) are caulking holes, ko i (k o1, k o2, k o3, k o4) and ko2 i (k o21, k o22, k o23, k o24) are caulk cut-down parts, 1 h2 is the length of notch, and 1 h22 is the length of notch.

In FIGS. 19 to 30, reference numerals 110 designates the iron core of laminated heterogeneous materials, numerals 111 to 114 designate the amorphous iron core pieces, 115 to 122 are the iron core pieces of the electromagnetic steel plates, 123 is the iron core pieces of laminated heterogeneous materials of a first step, 124 is the iron core pieces of laminated heterogeneous materials of a second step, 125 is the iron core pieces of laminated heterogeneous materials of a third step, 126 is the iron core pieces of laminated heterogeneous materials of a fourth step, 127 is an inside caulking part (caulking part), and 128 is an outside caulking part (caulking part).

129 is blanks of the iron core pieces (plates of laminated heterogeneous materials), 130 and 131 are the electromagnetic steel plates (plate materials), 132 is the amorphous material (high magnetic material of hard workability), 133 is guide holes, 134 is slot holes, 135 is engaging holes, 136 is engaging holes, 137 is a die, 138 is a punch, 139 is a stopper, and 139a is a bed.

140 and 141 are notching holes, 142 is the punch, 143 is a predetermined part of the notching part, 144 is a notching punch, 150 is the iron core of laminated heterogeneous materials, 151 is the notching punch, 152 to 154 are the amorphous iron core pieces, 155 to 160 are the iron core pieces of the electromagnetic steel plate, 161 to 163 are the iron core pieces of laminated heterogeneous materials of the second to fourth steps, 164 is the predetermined part of the notching part, 165 is the notching hole, 166 to 168 are the notching holes, and 169 is the notching punch.

BEST MODE FOR CARRYING OUT THE INVENTION

In the following description, explanation will be made to the present invention with reference to the attached drawings showing the embodiments.

As shown in FIG. 1, the metal plate 1 of laminated heterogeneous materials as the first embodiment according to the invention is composed by alternately laminating the electromagnetic steel plates (metal plate of the upper side) 21, (metal plates of the lower side) 22, 23, and the amorphous plates of hard workability (metal plates of hard workability) 31, 32, and joining to caulk them at the caulking parts k1, k2, k3, k4.

The amorphous plates 31, 32 have, other than excellent permeability and holding power, characteristics such as very high electric resistance and very little current loss, that is, least iron loss, but extremely high hardness and hard workability.

The amorphous plates 31, 32 have ultra thin thickness, for example, as around 0.02 to 0.06 mm.

The electromagnetic steel plates 21, 22, 23 have the better workability than that of the amorphous plates 31, 32, and also the desirable magnetic characteristic, though being not as the amorphous plates 31, 32.

The plate thickness is, for example, around 0.15 to 0.20 mm, and is smaller than that of existing electromagnetic steel plates.

The metal plate 1 of laminated heterogeneous materials of the above mentioned structure is made through the following method.

Reference will be made to forming of the caulking part k1 and the caulking joint in the metal plate 1 of laminated heterogeneous materials.

Figure 2:
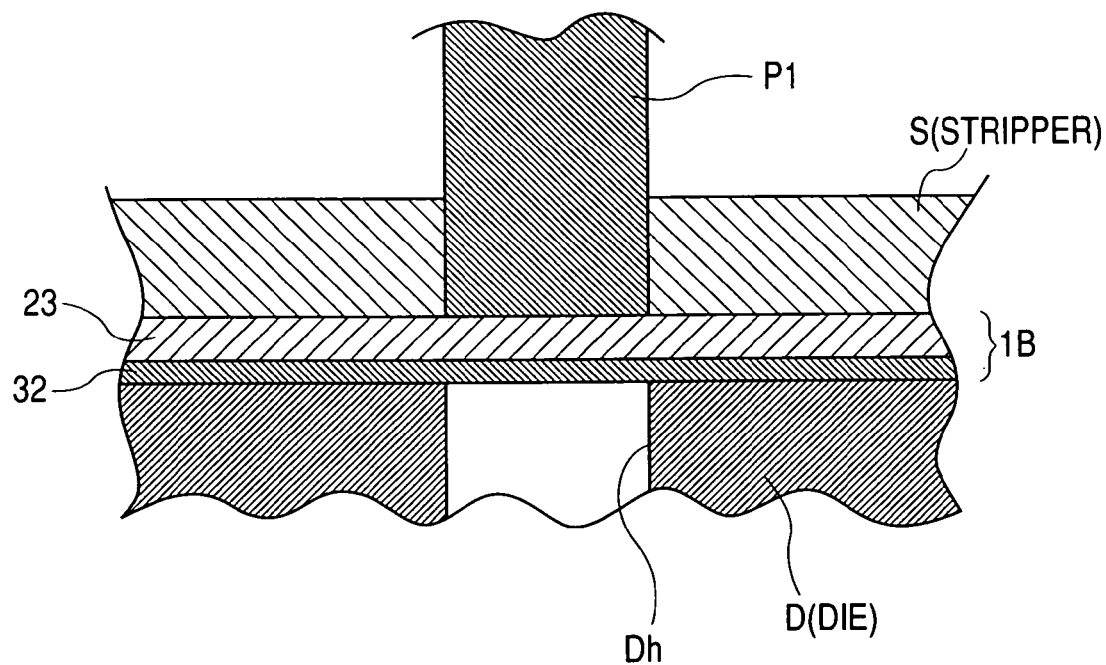
FIG. 2 is a cross sectional view showing a punching process of a caulking hole in a lower layer of the metal plate of laminated heterogeneous materials of the first embodiment according to the invention.
Figure 3:
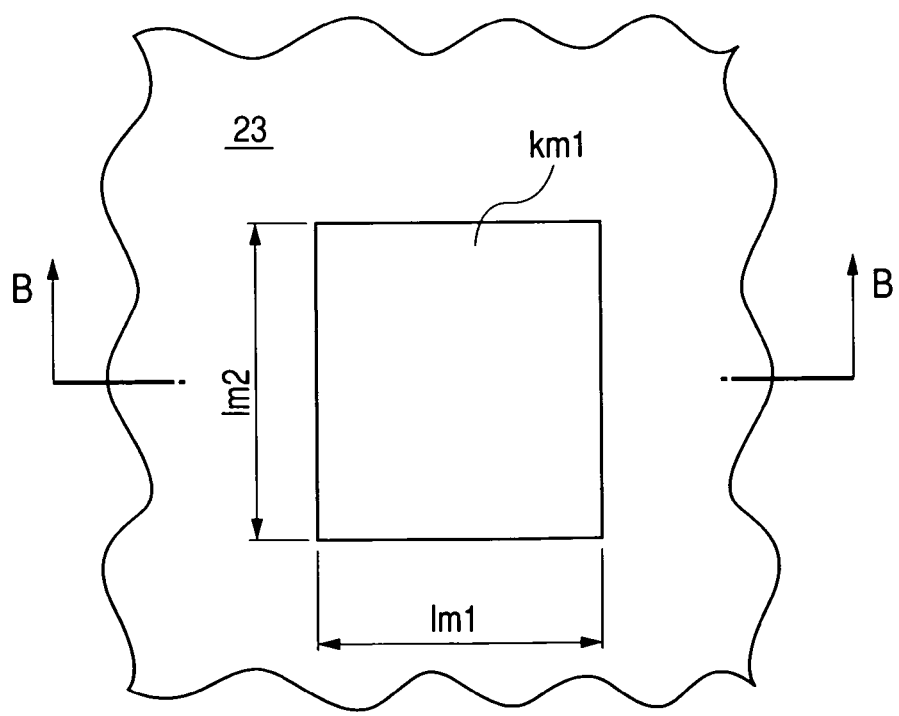
FIG. 3 is a top view after having formed the caulking hole.
Figure 4:
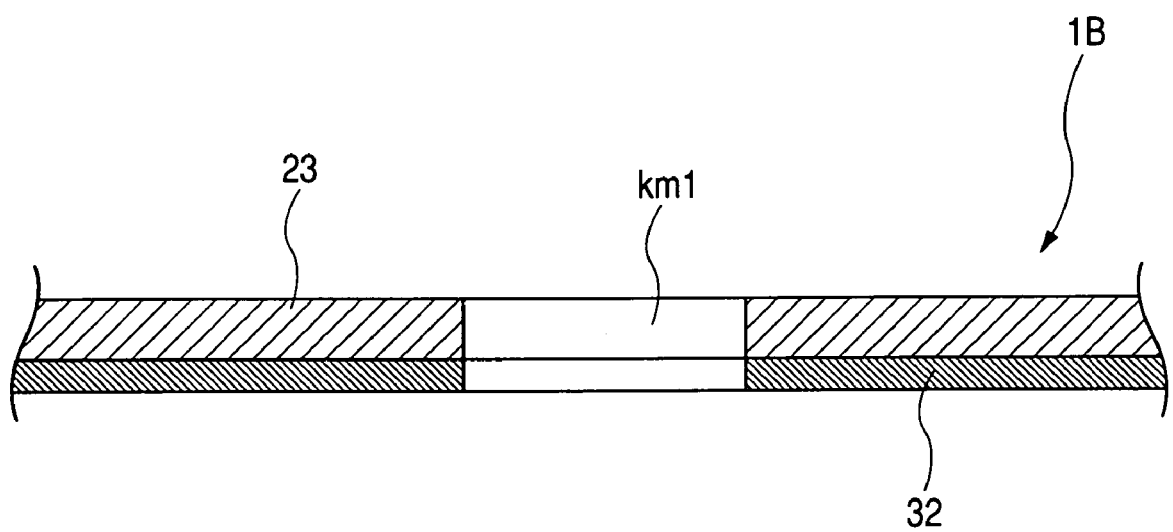
FIG. 4 is the cross sectional view along B-B line of FIG. 3.

As shown in FIG. 2, a punch P1 of a press molding apparatus is reciprocally moved toward a die hole Dh with respect to the lower layer of the metal plate of laminated heterogeneous materials (the second metal plate of laminated heterogeneous materials), which is laminated with the electromagnetic steel plate 23 on the amorphous plate 32 of a predetermined size, and a caulking hole km1 is punched which is a rectangular hole of width 1 m1 and length 1 m2 as shown in FIGS. 3 and 4.

Figure 8:
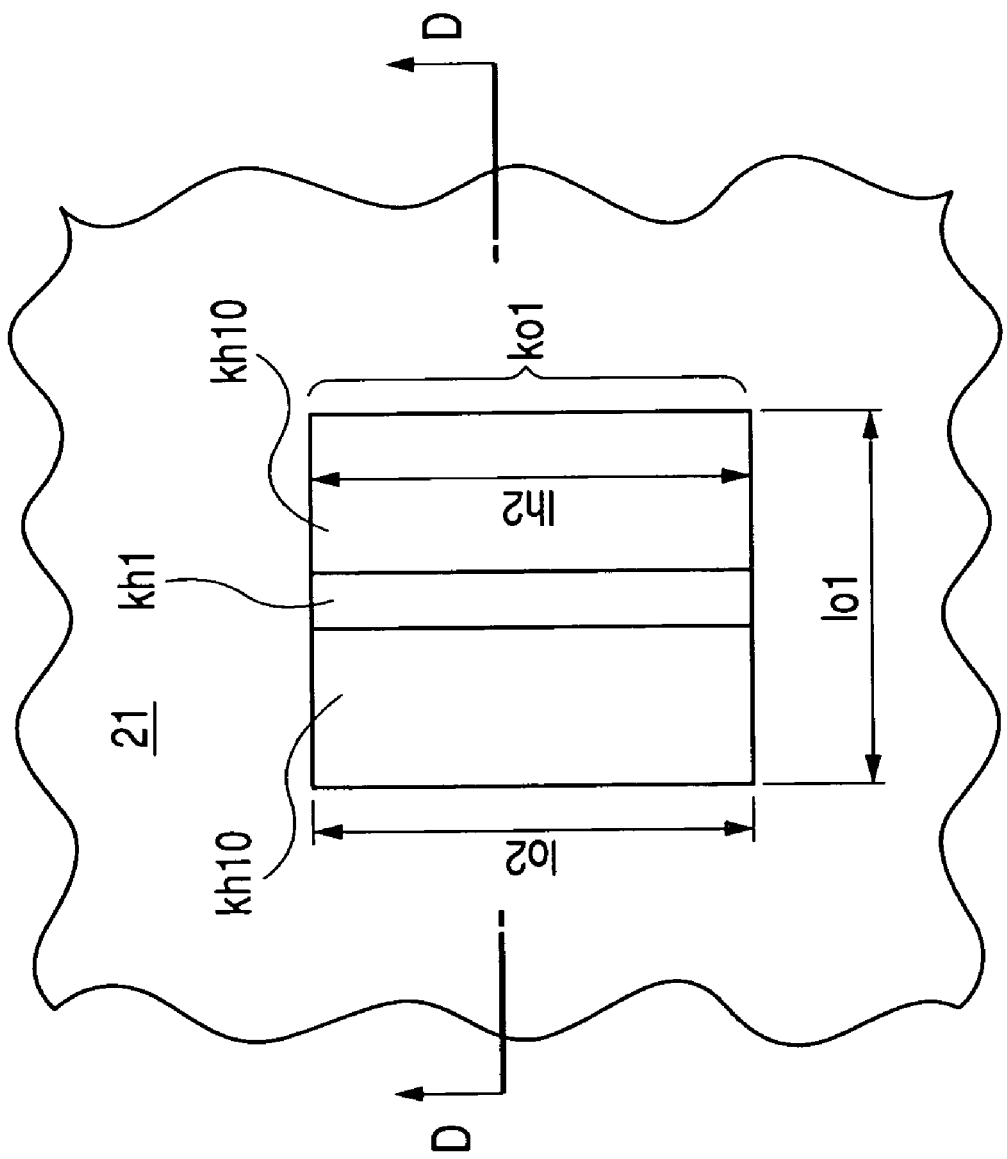
FIG. 8 is the plan view after having formed a caulk cut-down part having the caulking hole.

Herein, the width 1 m1 of the caulking hole km1 of the lower layer 1B of the metal plate of laminated heterogeneous materials is equal to or slightly larger than the width 1 o1 of the caulk cut-down part k o1 (see FIG. 8) of the upper layer of the metal plate of laminated heterogeneous materials (the first metal plate of laminated heterogeneous materials) 1A.

The length 1 m2 of the caulking hole km1 is equal to or slightly larger than the length 1 o2 of the caulk cut-down part k 01 of the upper layer 1A of the metal plate of laminated heterogeneous materials 1A.

Figure 5:
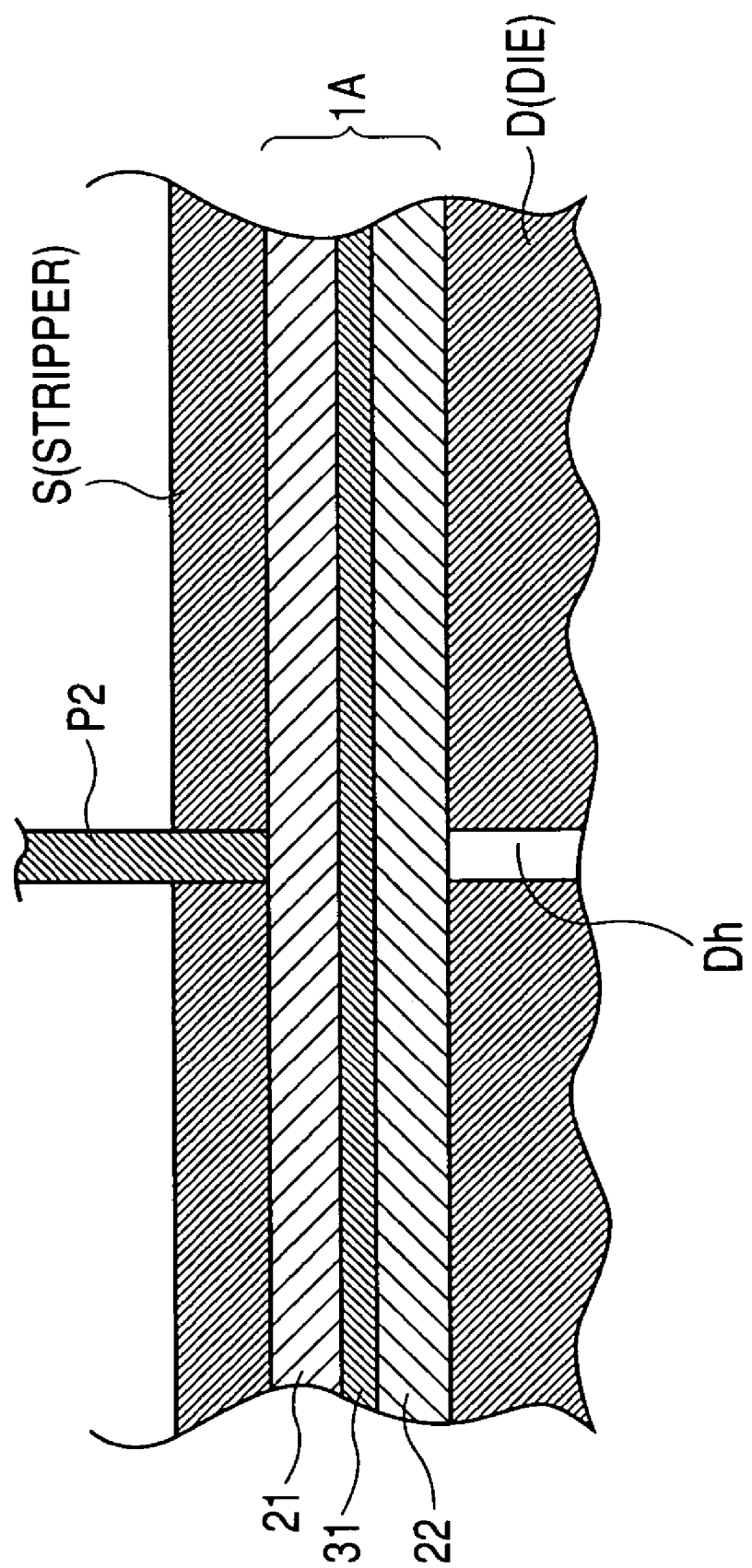
FIG. 5 is the cross sectional view showing the punching process of the caulking hole in an upper layer of the metal plate of laminated heterogeneous materials of the first embodiment according to the invention.
Figure 6:
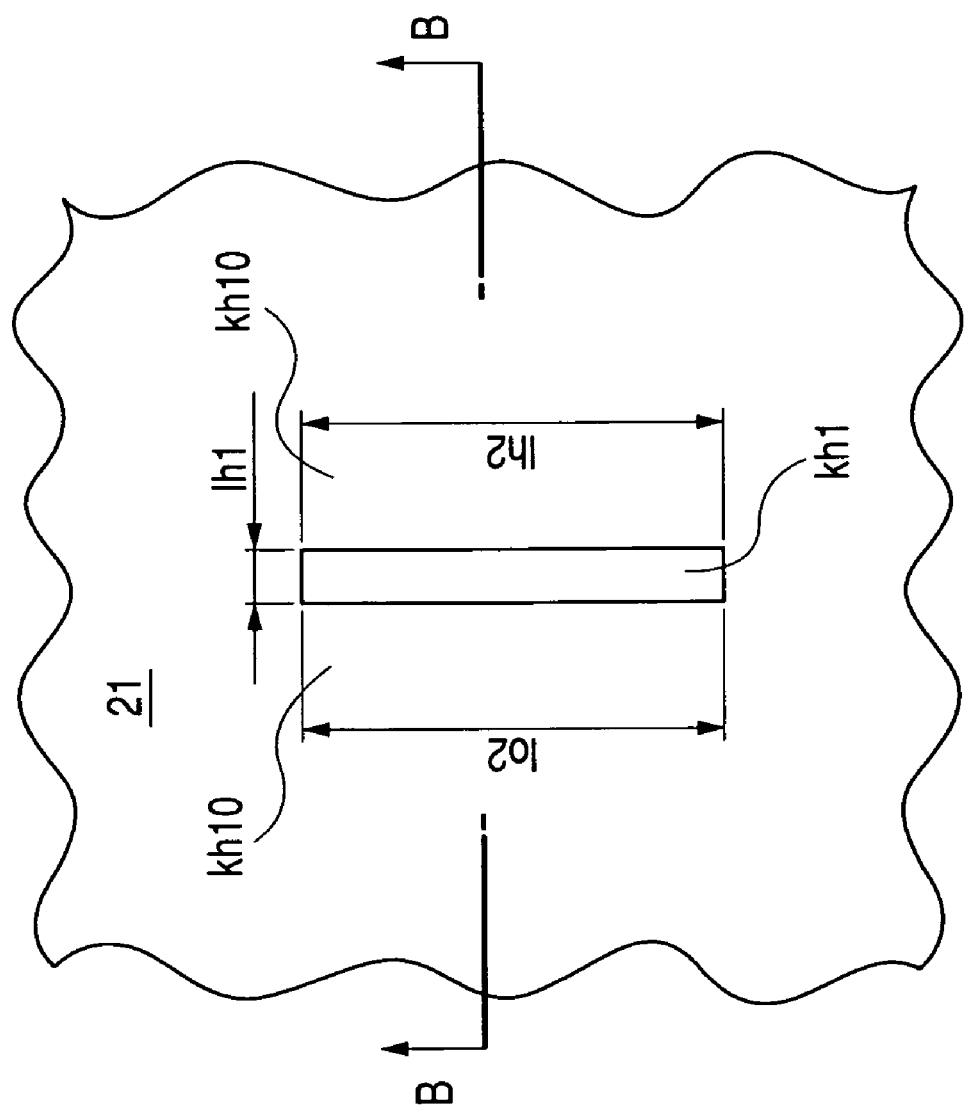
FIG. 6 is the top view after having formed the caulking hole.
Figure 7:
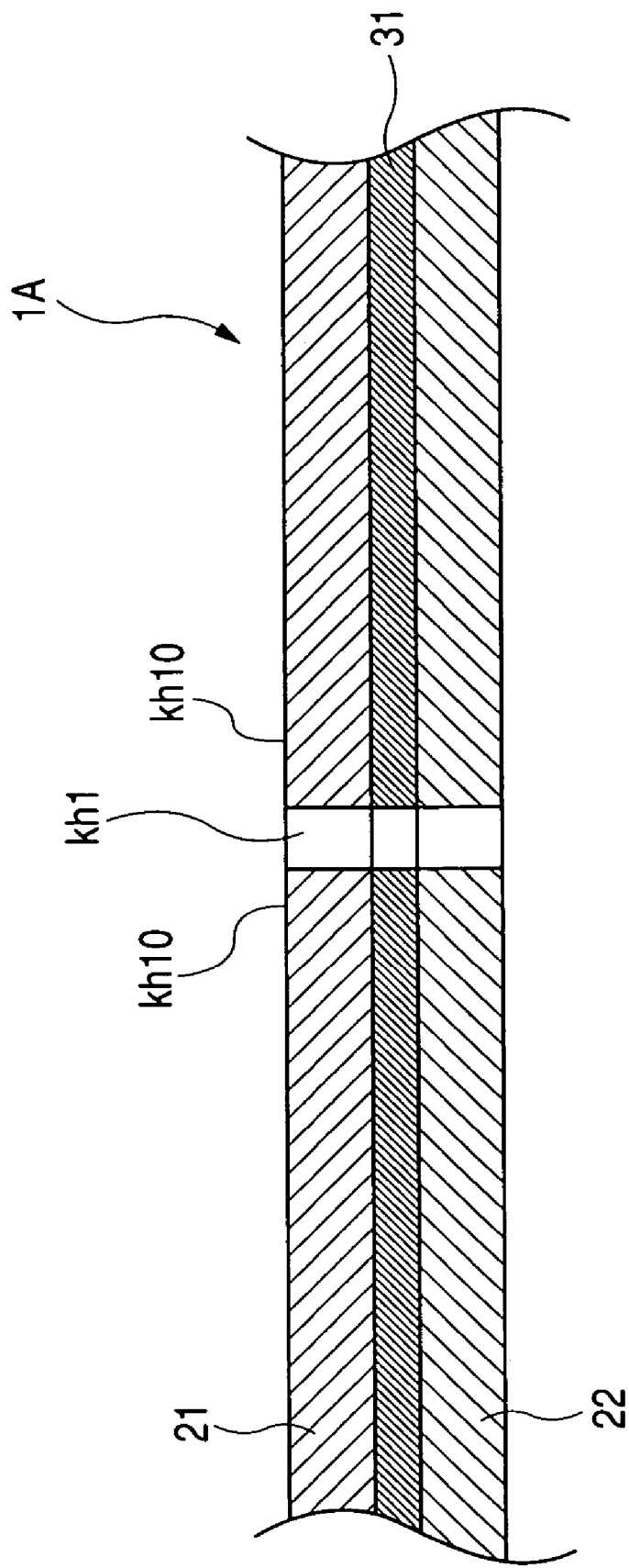
FIG. 7 is an enlarged cross sectional view along B-B line of FIG. 6.

On the other hand, as shown in FIG. 5, the punch P2 of the press molding apparatus is reciprocally moved toward the die hole Dh with respect to the upper layer 1A of the metal plate of laminated heterogeneous materials, which is laminated with the electromagnetic steel plate 21 of the predetermined size, the amorphous plate 31 and the electromagnetic steel plate 22, and the caulking hole kh1 is punched which is the rectangular hole of width 1 h1 and length 1 h2 as shown in FIG. 6 (plan view) and FIG. 7 (cross sectional view).

The notch kh1 is so opened as to have a length 1 h2 being equal to a length 1 o2 of the caulk cut-down part k o1 to be formed in a subsequent process.

Figure 9:
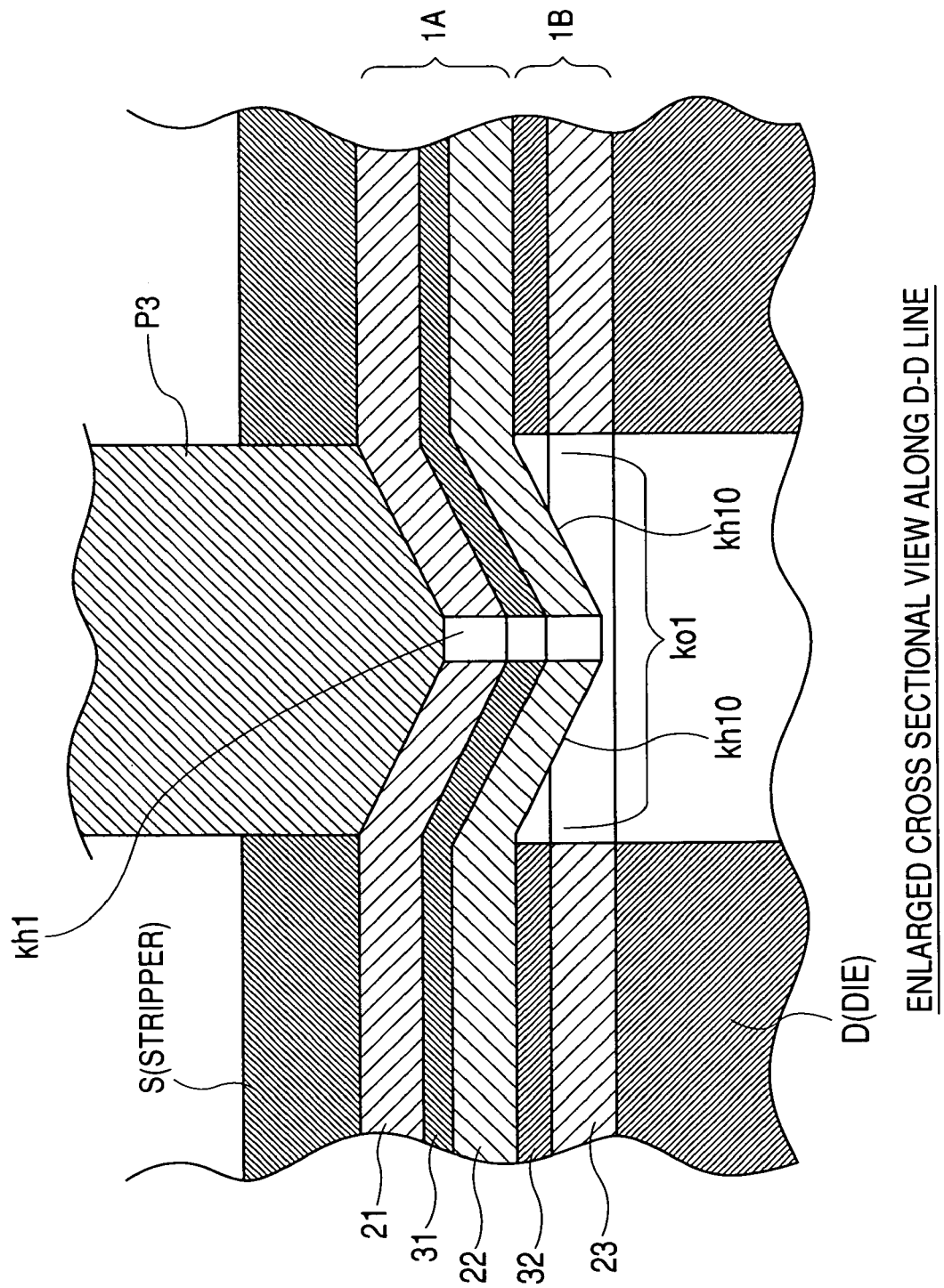
FIG. 9 is the enlarged cross sectional view along D-D line of FIG. 8.

The upper layer 1A of the metal plate of laminated heterogeneous materials punched with the notch kh1 is placed on the lower layer part 1B of the metal plate of laminated heterogeneous materials, which has previously been punched with the caulking hole k m1, and as shown in FIG. 9, the caulking punch P3 of the press molding apparatus presses down the edge part (row of both end sides, and rows of both ends in the length direction of notch) kh10 around the notch of the upper layer part 1A of the metal plate of laminated heterogeneous materials.

The rectangular caulk cut-down part (caulking projection) k o1 of width 1 o1 and length 1 o2 is formed (refer to FIG. 8), and is urged into the caulked hole km1 of the lower layer part 1B of the metal plate of laminated heterogeneous materials.

The length 1 o2 of the caulk cut-down part k o1 is formed along the rows of both ends of the length 1 h2 of the notch kh1.

The abovementioned explanation is concerned with forming of the caulking cut-down part k o1 and the caulking hole km1 of the caulking part in the metal plate 1 of laminated heterogeneous materials and the joining method of them, and the caulking parts k2, k3, k4 in the metal plate 1 of laminated heterogeneous materials are formed and caulked in the same manner as in the caulking part k1.

In this way, the metal plate 1 of laminated heterogeneous materials is provided as shown in FIG. 1 by unifying the lower layer part 1B and the upper layer part 1A of the metal plate of laminated heterogeneous materials.

The above mentioned embodiment exemplifies that the metal plate of laminated heterogeneous materials 1 is composed by holding the amorphous plate 3 of hard workability between the electromagnetic steel plates 2, and in substitution for the electromagnetic steel plate, it is possible to employ a cheap and low carbon steel plate, an electromagnetic soft iron plate of better workability than that of the electromagnetic steel plate, Fe—Ni alloy plate of high permeability and good corrosion resistance, or a copper plate of good workability, good conductivity and high heat conductivity.

These metal plates are selected in response to purposes of using the metal plate 1 of laminated heterogeneous materials.

By the way, the metal plate 1 of laminated heterogeneous materials is the laminated plates of five layers in this embodiment, but this number is not limited, for example, three, four, six or seven layers are available. The laminated thickness may be arbitrary, for example, 0.20 to 0.80 mm.

According to the above mentioned structure, the upper layer 1A of the metal plate of laminated heterogeneous materials is produced in that the caulk cut-down parts koi having the notches khi (i=1, 2, 3, 4) are formed on the upper layer part 1A of the metal plate of laminated heterogeneous materials as mentioned above, and at the same time, the caulking hole kmi is formed in the lower layer 1B of the metal plate of laminated heterogeneous materials, and the respective caulk cut-down parts koi of the upper layer part 1A of the metal plate of laminated heterogeneous materials are caulked and joined to the respective caulked holes kmi of the lower layer part 1B of the metal plate of laminated heterogeneous materials.

Therefore, when forming the caulk cut-down parts koi having the notches kh i and caulking it to the upper layer part 1A of the metal plate of laminated heterogeneous materials, the amorphous plate 31 is held between the electromagnetic steel plates 21 and 22 having better workability than that of the amorphous plate 31, and since the amorphous plate 31 is thinner than the electromagnetic steel plates 21, 22 and said notch kh i has been formed, damages as cracks or breakage are not generated, the amorphous plate 31 is deeply cut down.

Further, when forming the caulking hole kmi in the lower layer part 1B of the metal plate of laminated heterogeneous materials, since the amorphous plate 32 is, in this embodiment, punched with the caulking hole kmi under a condition of laminating the electromagnetic steel plate 23 on the upper part thereof, damages as breakage are not generated.

In the lower layer 1B of the metal plate of laminated heterogeneous materials, a three-layered plate may be made by holding the amorphous plate between the electromagnetic steel plates.

The respective caulk cut-down parts koi are formed with the notches kh i as mentioned above, and when attending to the caulking work, the caulk cut-down parts koi can be deeply cut down in the respective caulking parts, and the plate thickness or width are not reduced in size in said caulk cut-down parts, and a caulk fitting part can be taken long even in a thin metal plate, so that the respective caulking parts ki are firmly joined.

Thus, the plurality of laminated metal plates of different material qualities are stably joined one another, and the strongly unified metal plate of laminated heterogeneous materials is provided.

Since the metal plate 1 of laminated heterogeneous materials of this embodiment is laminated with the amorphous plate 3 and the electromagnetic steel plate 2, there are synergized the good magnetic characteristic and extremely low iron loss owned by the amorphous plate 3, and the good permeability, the high magnetic flux density and the low iron loss owned by the electromagnetic steel plate 2, so that the metal plate 1 of laminated heterogeneous materials is available, which has the excellent electromagnetic characteristic and the workability durable against almost all of processes by the electromagnetic steel plates.

If substituting for the electromagnetic steel plate 2 and composing the metal plate 1 of laminated heterogeneous materials by holding the amorphous plate 3 between the low carbon steel plates, it is possible to make the most of said characteristics of the amorphous plate 3, and concurrently the metal plate 1 of laminated heterogeneous materials more supplemented with workability may be provided, while costing down.

If substituting for the electromagnetic steel plate 2 and composing the metal plate of laminated heterogeneous materials by holding the amorphous plate 3 between the electromagnetic soft iron plates, it is possible to make the most of said characteristics of the amorphous plate 3, and the metal plate 1 of laminated heterogeneous materials supplemented with workability may be provided while costing down.

If substituting for the electromagnetic steel plate 2 and composing the metal plate of laminated heterogeneous materials by holding the amorphous plate 3 between the Fe—Ni alloy plates, it is possible to make the most of said characteristics of the amorphous plate 3, and the metal plate 1 of laminated heterogeneous materials may be provided, making the most of corrosion resistance, the high permeability and strong resistance owned by Fe—Ni alloy plate under bad circumstances.

If substituting for the electromagnetic steel plate 2 and composing the metal plate 1 of laminated heterogeneous materials by holding the amorphous plate 3 between the copper plates, it is possible to provide the metal plate 1 of laminated heterogeneous materials which is easy to process, and has the electrical conductivity and the heat conductivity owned by the copperplate, while making the most of said characteristics owned by the amorphous plate 3.

Next, explanation will be made to a second embodiment.

Figure 10:
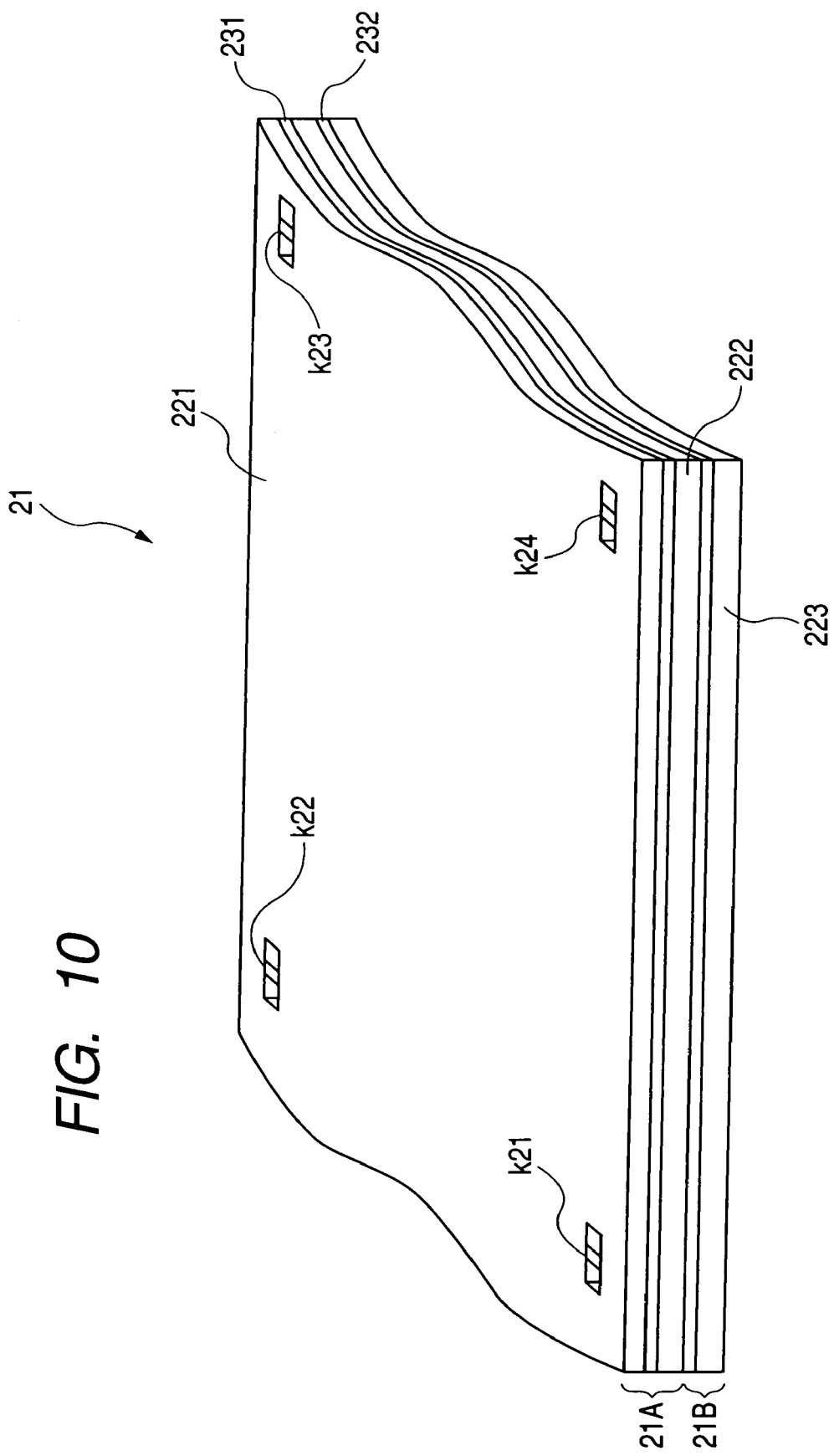
FIG. 10 is the perspective view showing the metal plate of laminated heterogeneous materials of a second embodiment according to the invention.

The metal plate 21 of laminated heterogeneous materials as the second embodiment according to the invention is, as shown in FIG. 10, composed by alternately laminating the electromagnetic steel plates (metal plate of the upper side) 221, (metal plates of the lower side) 222, 223, and the amorphous plates of hard workability (metal plates of hard workability) 231, 232, and joining to caulk them at the caulking parts k21, k22, k23, k24.

The above structured metal plate 21 of laminated heterogeneous materials is made by the following method.

Reference will be made to forming of the caulking part k1 and the caulking joint in the metal plate 21 of laminated heterogeneous materials, differently from the above mentioned first embodiment.

Figure 11:
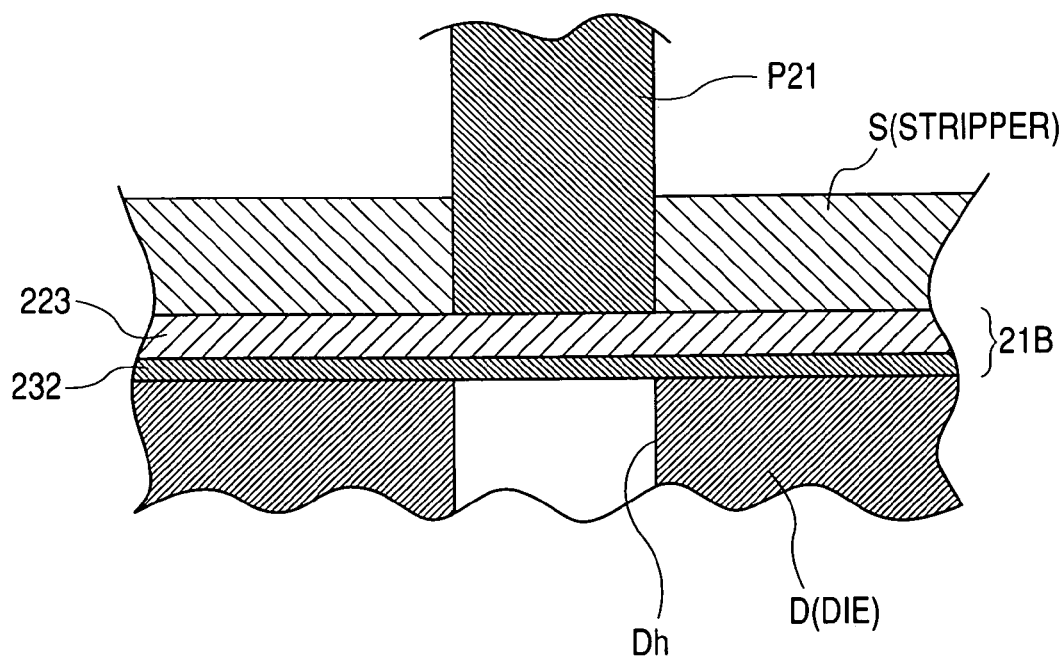
FIG. 11 is the cross sectional view showing the punching process of the caulking hole in the lower layer of the metal plate of laminated heterogeneous materials of the second embodiment according to the invention.
Figure 12:
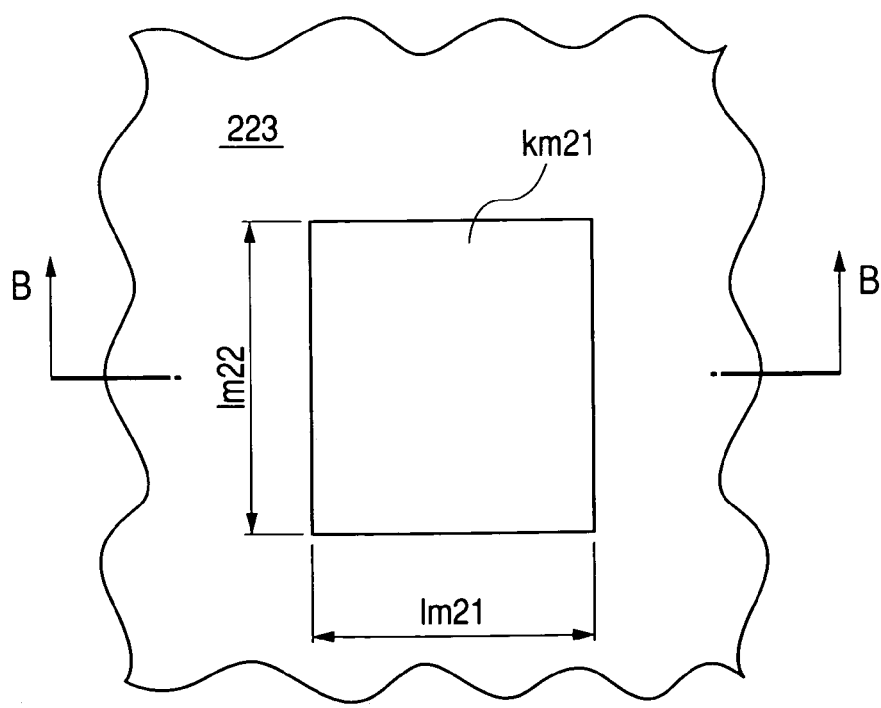
FIG. 12 is the top view after having formed the caulking hole.
Figure 13:
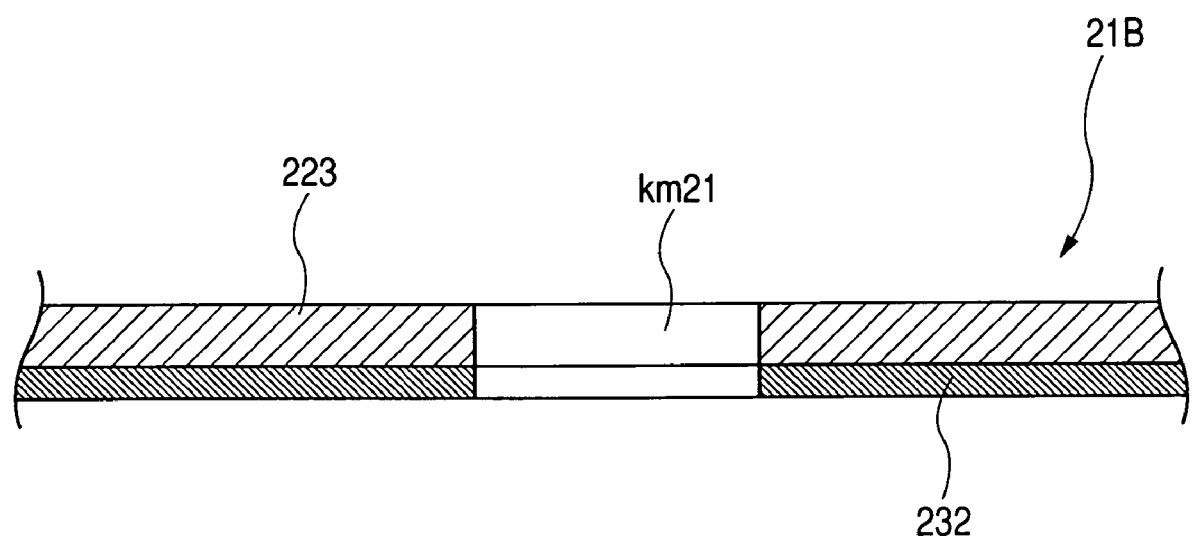
FIG. 13 is the cross sectional view along B-B line of FIG. 12.

As shown in FIG. 11, a punch P21 is reciprocally moved toward a die hole Dh with respect to the lower layer of the metal plate of laminated heterogeneous materials (second body of the metal plate of laminated heterogeneous materials) 21B, and as shown in FIGS. 12 (plan view) and 13 (cross sectional view), a caulking hole km21 is punched which is a rectangular hole of width 1 m1 and length 1 m2.

Figure 14:
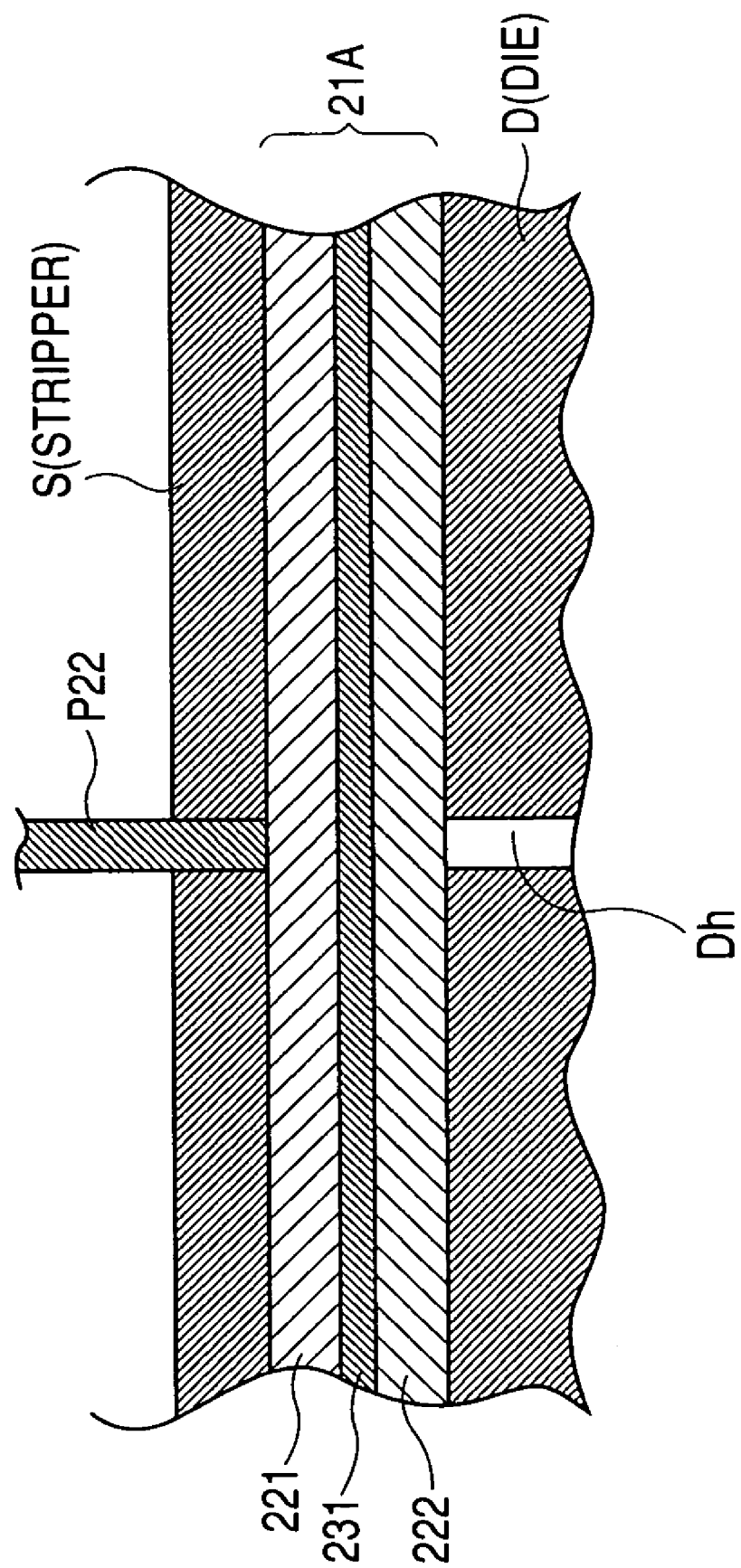
FIG. 14 is the cross sectional view showing the punching process of the caulking hole in the upper layer of the metal plate of laminated heterogeneous materials of the second embodiment according to the invention.

On the other hand, as shown in FIG. 14, with respect to the upper layer of the metal plate of laminated heterogeneous materials (first body of the metal plate of laminated heterogeneous materials) 21A which is laminated with the electromagnetic steel plate 221 of predetermined size, amorphous plate 231, and electromagnetic steel plate 222, the punch P22 of the press molding apparatus is reciprocally moved toward the die hole Dh so as to punch a notch kh21 in a predetermined range to be caulked.

Figure 15:
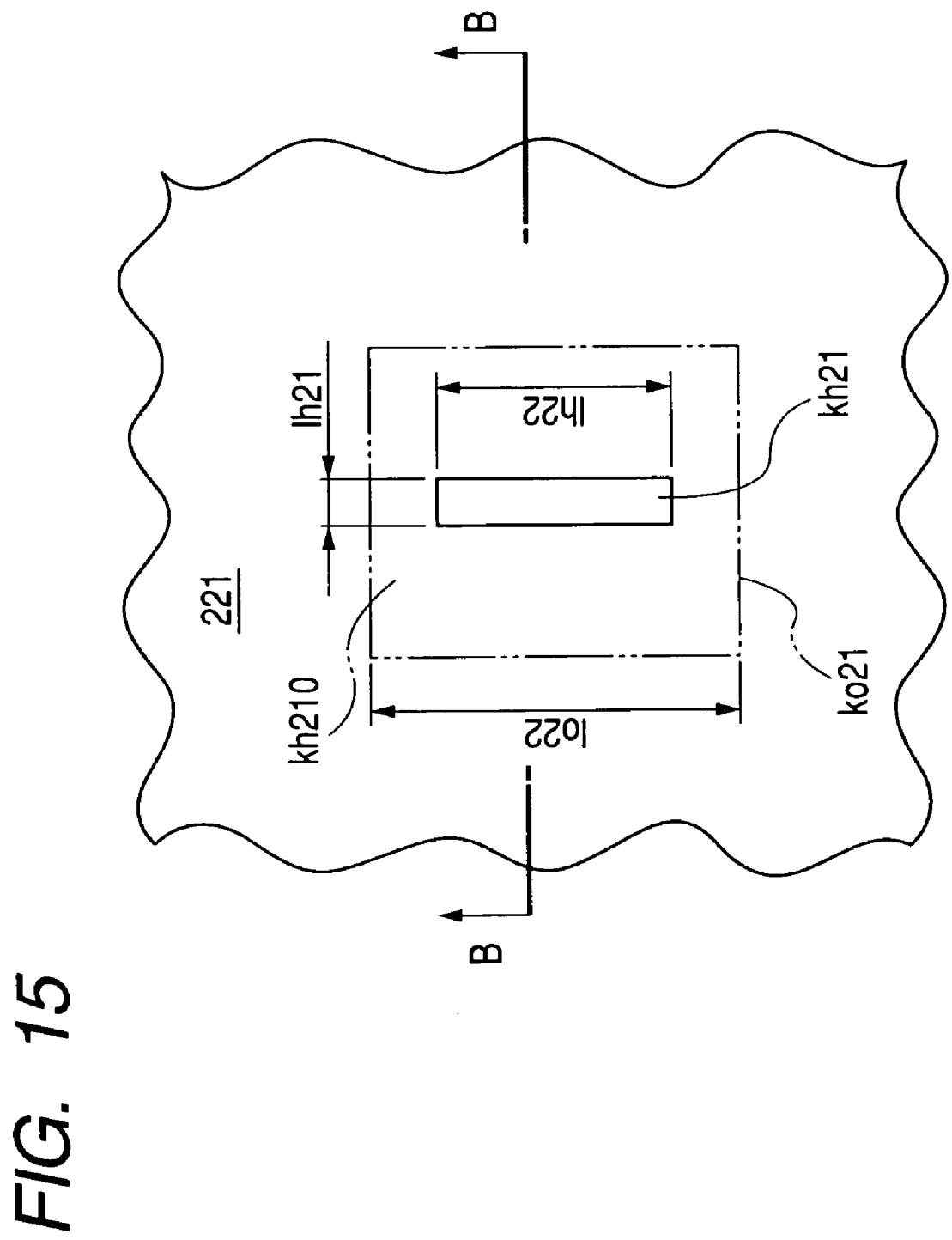
FIG. 15 is the top view after having formed the caulking hole.
Figure 16:
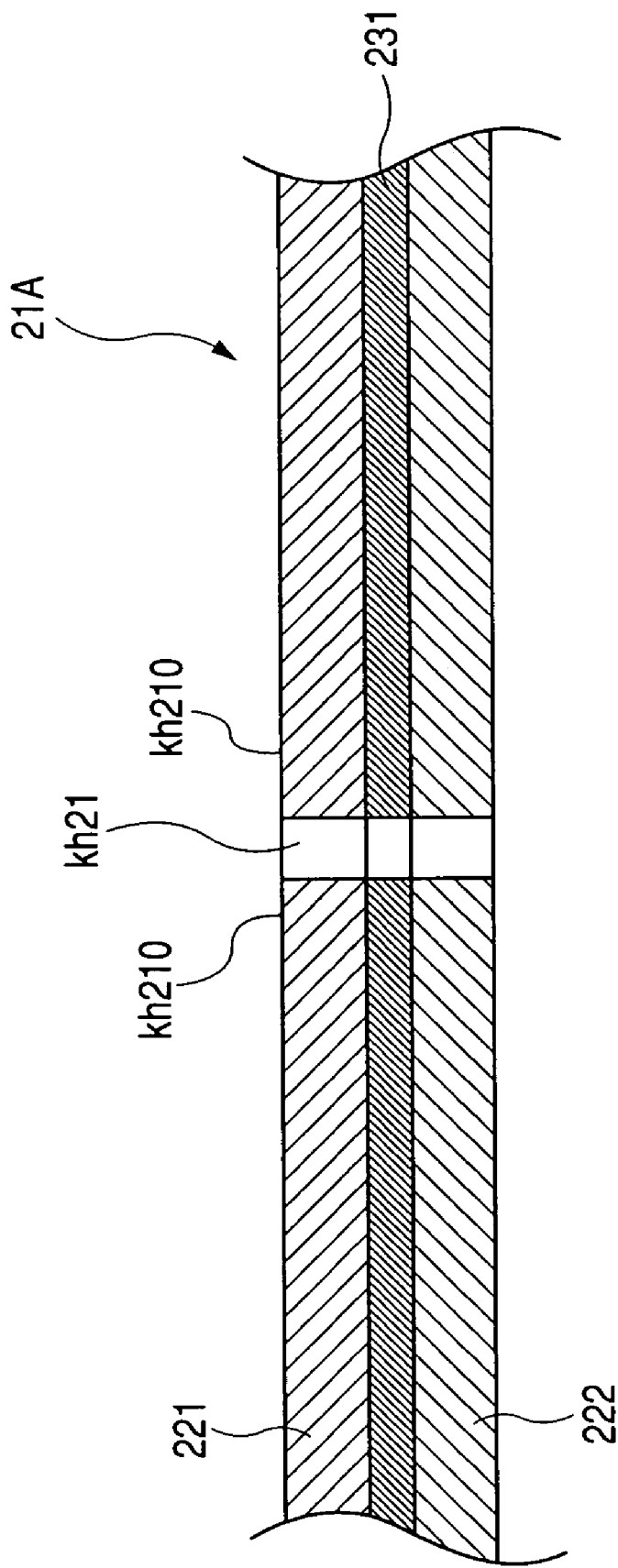
FIG. 16 is the enlarged cross sectional view along B-B line of FIG. 15.

As shown in FIGS. 15 and 16, the notch kh21 is a rectangular hole of width 1 h21 and length 1 h22.

The notch kh21 is so processed as to have a length 1 h22 being somewhat shorter than a length 1 o22 of the caulk cut-down part k o21 to be formed in a subsequent process (in FIG. 15, the caulk cut-down part k o21 to be formed in the caulking process is shown with two-dotted line).

Figure 18:
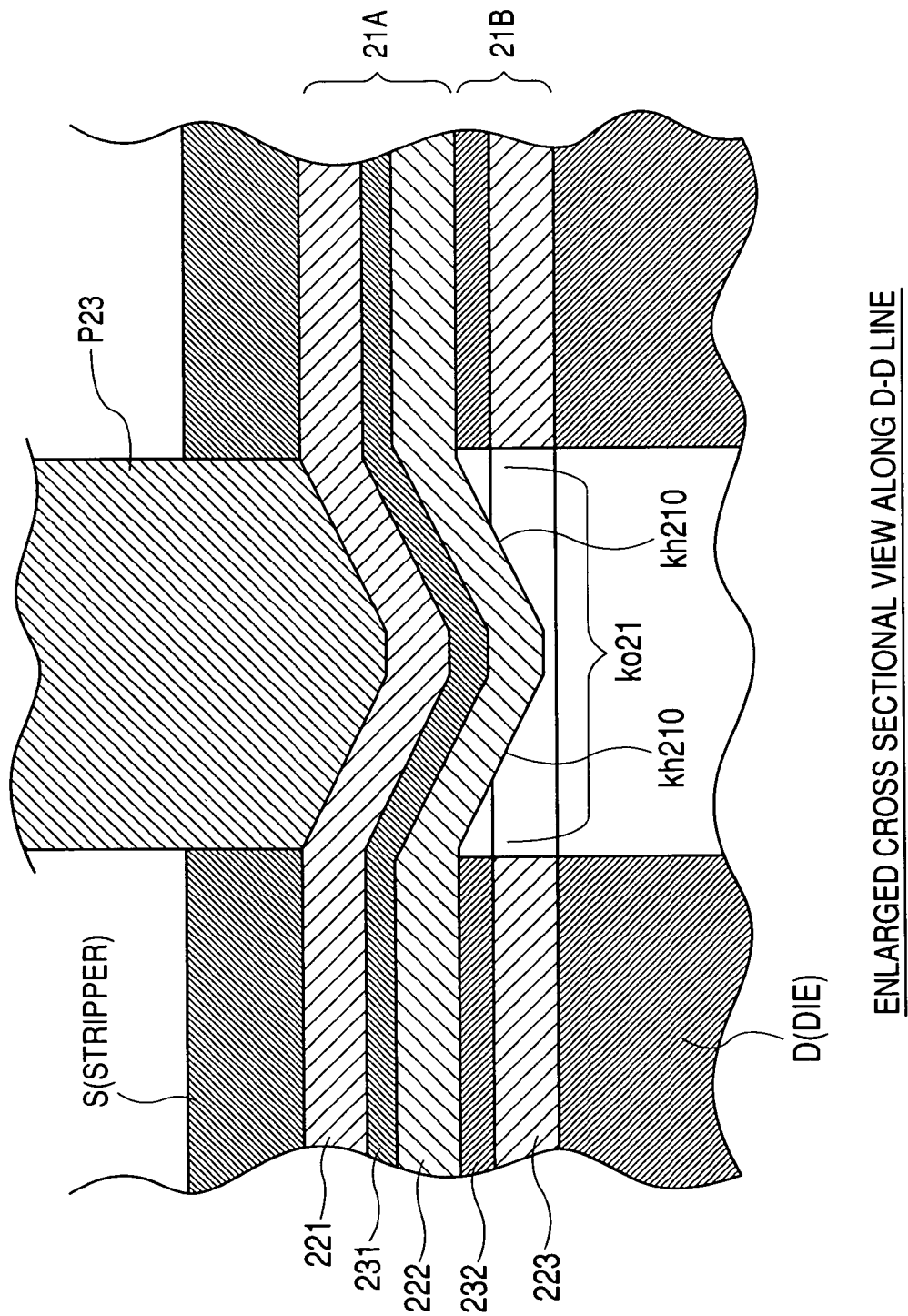
FIG. 18 is the enlarged cross sectional view along D-D line of FIG. 17.

The upper layer 21A of the metal plate of laminated heterogeneous materials punched with the above mentioned notch kh21 is placed on the lower layer part 21B of the metal plate of laminated heterogeneous materials, which has previously been punched with the caulking hole k m21, and as shown in FIG. 18, the caulking punch P23 of the press molding apparatus cuts down from the part k h210 (row of both end sides, and rows exceeding both ends in the length direction of notch) exceeding both ends in the length direction of the notch kh21 around the notch kh21 of the upper layer 21A of the metal plate of laminated heterogeneous materials.

Figure 17:
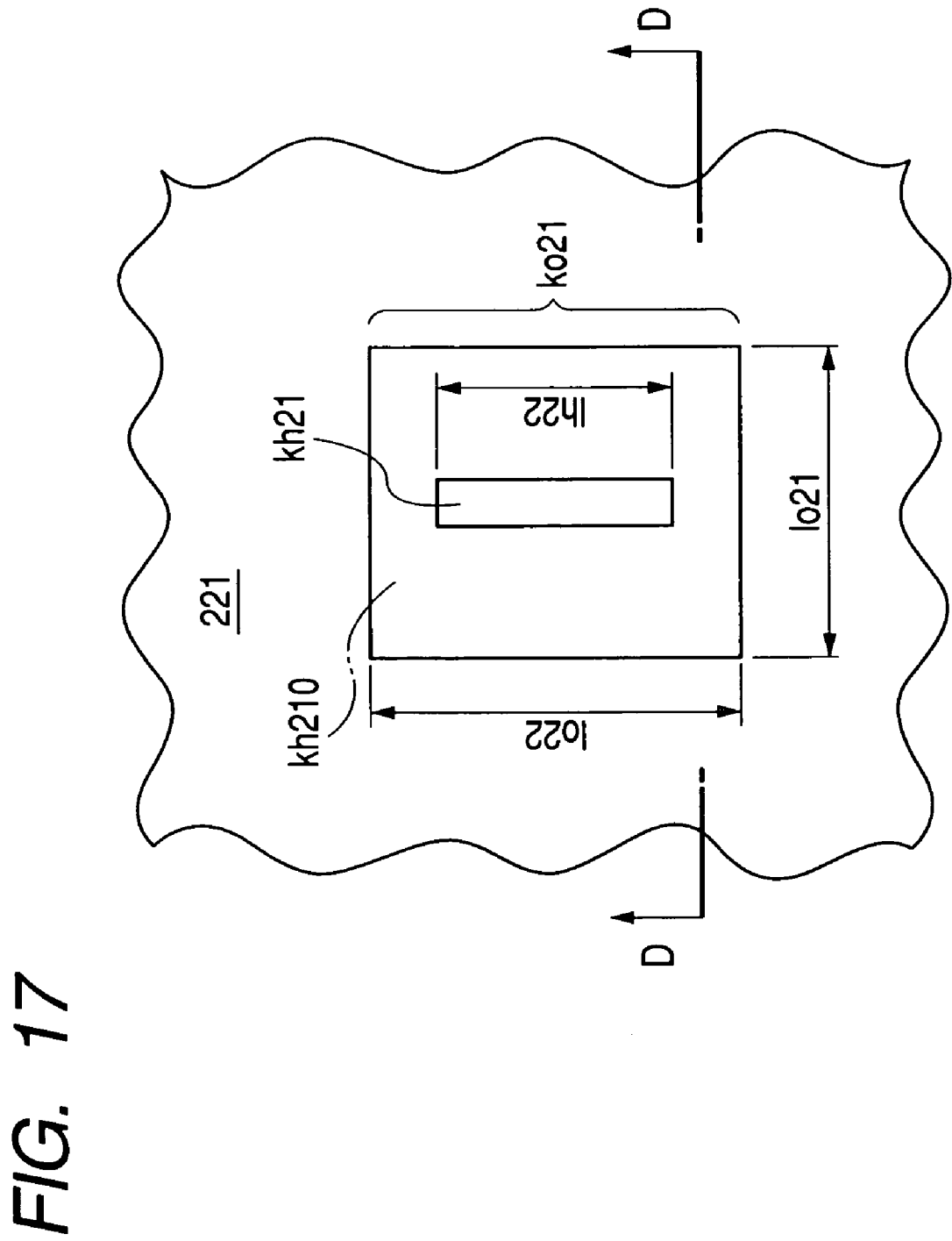
FIG. 17 is the top view after having formed the caulk cut-down part having the caulking hole.

The rectangular caulk cut-down part (caulking projection) k o21 of width 1 o21 and length 1 o22 is formed (refer to FIG. 17), and at the same time is fitted into the caulked hole km21 of the lower layered metal 21B of laminated heterogeneous materials.

As mentioned above, since the length 1 o22 of the caulk cut-down part k o21 is larger than the length 1 h22 of the notch kh21, the caulking projection has, on the bottom, a part of connecting the left and right sides, thereby to heighten the mechanical strength, so that the caulking strength is more increased.

The above mentioned explanation is concerned with the forming and the caulking joint of the caulk cut-down part ko21 and caulking hole km21 of the caulking part k 21 in the metal plate 21 of laminated heterogeneous materials, and the caulking parts k 22, k 23, k 24 in the metal plate 21 of laminated heterogeneous materials are performed as in the same manner as in the caulking part k 21.

As mentioned above, the metal plate 21 of laminated heterogeneous materials is made by joining the lower layer 21B and the upper layer 21A of laminated heterogeneous materials.

The above embodiment exemplifies that the amorphous plate 23 of hard workability is held between the electromagnetic steel plates 22, but similarly to the precedent embodiment, if substituting for the electromagnetic steel plate 22 and employing the low carbon steel plate, electromagnetic soft iron plate, Fe—Ni alloy plate or copper plate, such a metal plate 21 of laminated heterogeneous materials is available which has the characteristic in response to the combination of respectively employed plate materials.

The characteristic of this second embodiment is present in that since the length $1 h22$ of the notch kh2 i (i=1, 2, 3, 4) is shorter than the length $1 o22$ of the caulk cut-down part k o2 i, the caulk cut-down part k o2 i has, on the bottom, the part of connecting the left and right sides, thereby to heighten strength in the caulk cut-down part and this part is caulked with higher strength, so that the metal plate of laminated heterogeneous materials is more firmly unified.

The above embodiment exemplifies that the amorphous plate of hard workability is held between the electromagnetic steel plates on the upper layer of the metal plate of laminated heterogeneous materials, but it is sufficient that the electromagnetic steel plates are laminated on at least one side adjacent the amorphous plate or on only one side adjacent the amorphous plate.

Further, the above example is one layer of the amorphous plate in the upper layer of the metal plate of laminated heterogeneous materials, and of course, numbers of two, three layers, . . . other than one layer are also enough to structure the upper layer.

The embodiment exemplifies that the lower layer of the metal plate of laminated heterogeneous materials is laminated, in adjacency, with the amorphous plate of hard workability and the electromagnetic steel plates, but it is sufficient to laminate the electromagnetic steel plate on at least one side adjacent the amorphous plate.

The example is one layer of the amorphous plate in the upper layer of the metal plate of laminated heterogeneous materials, and of course, numbers of two, three layers, . . . other than one layer are also enough to structure the upper layer.

In addition, the upper layer of laminated heterogeneous materials is structured with three layers of the metal plates, and numbers of two, four, five layers, . . . . other than three layers are also enough to structure the upper layer. Similarly, the lower layer of laminated heterogeneous materials is structured with two layers of the metal plates, and numbers of one, three, four, five layers, . . . other than two layers are also enough to structure the upper layer.

The example is five layers of the metal plate of laminated heterogeneous materials, and of course, numbers of three, four, six, seven layers, . . . other than five layers are also enough to structure the upper layer.

The example is the four caulking positions in the metal plate of laminated heterogeneous materials, but no limit is made to the four positions, and the number of the caulking positions are arbitrary as two, three, five, . . . .

The example is that the caulking part of the metal plate of laminated heterogeneous materials is rectangular, but as far as that the intermediate part is notched and both sides of the notched part are cut down to form the caulking projection, the caulking part is not limited to the rectangular shape, but enough with other shapes such as a rectangle having R or C portions at corners, a long-ellipse or others.

The example is that the caulking hole of the caulk cut-down part is rectangular, and may be elliptic or circular in response to shapes of the caulking projections.

Further reference will be made to a third embodiment of applying the metal plate of laminated heterogeneous materials explained in the first and second embodiments to the iron core of rotor of motor.

Figure 19:
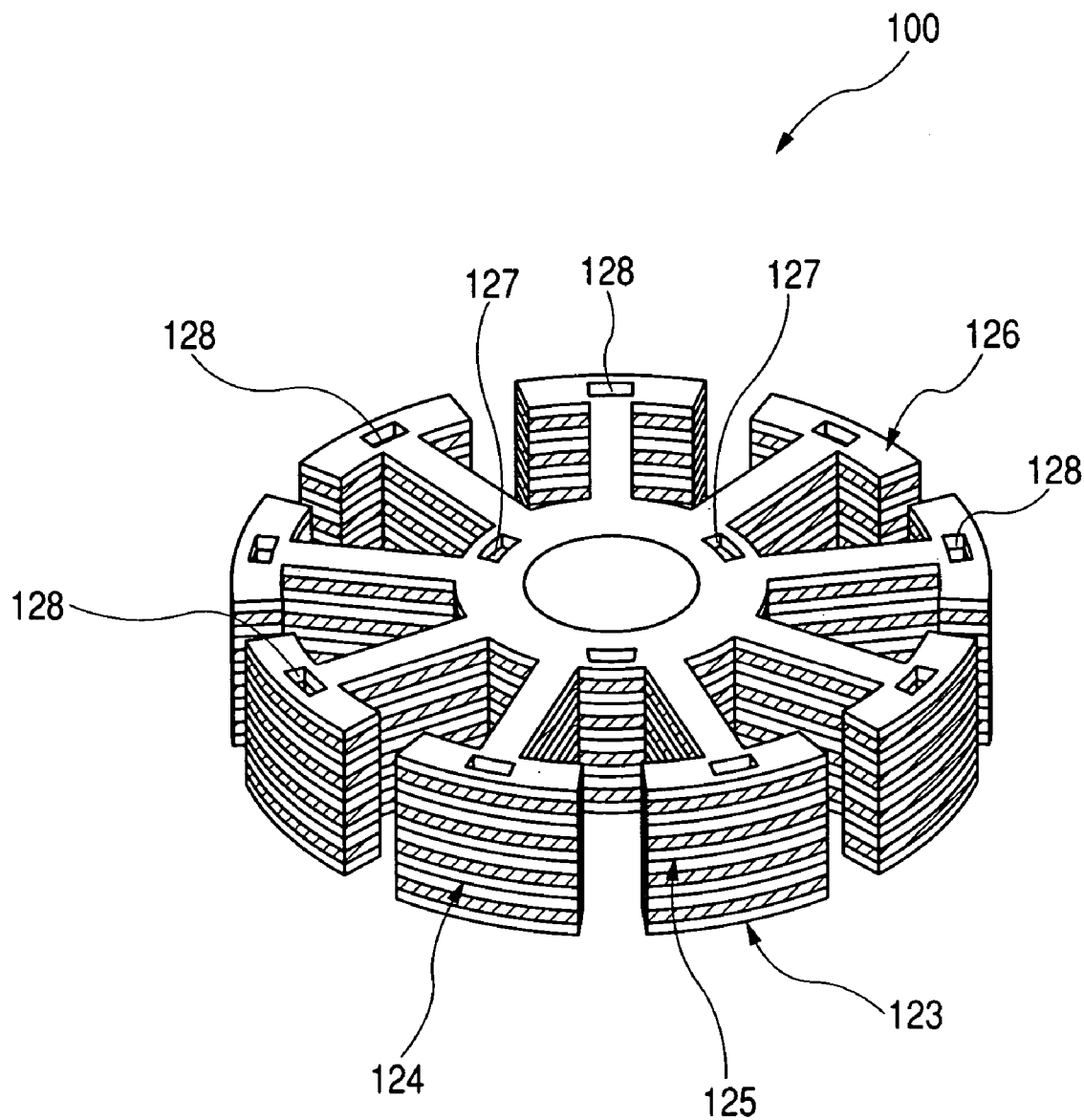
FIG. 19 is the perspective view of a rotor iron core of laminated heterogeneous materials of a third embodiment according to the invention.

FIG. 19 is a perspective view of applying the metal plate of laminated heterogeneous materials as the third embodiment according to the invention to the iron core of rotor of motor.

Figure 20:
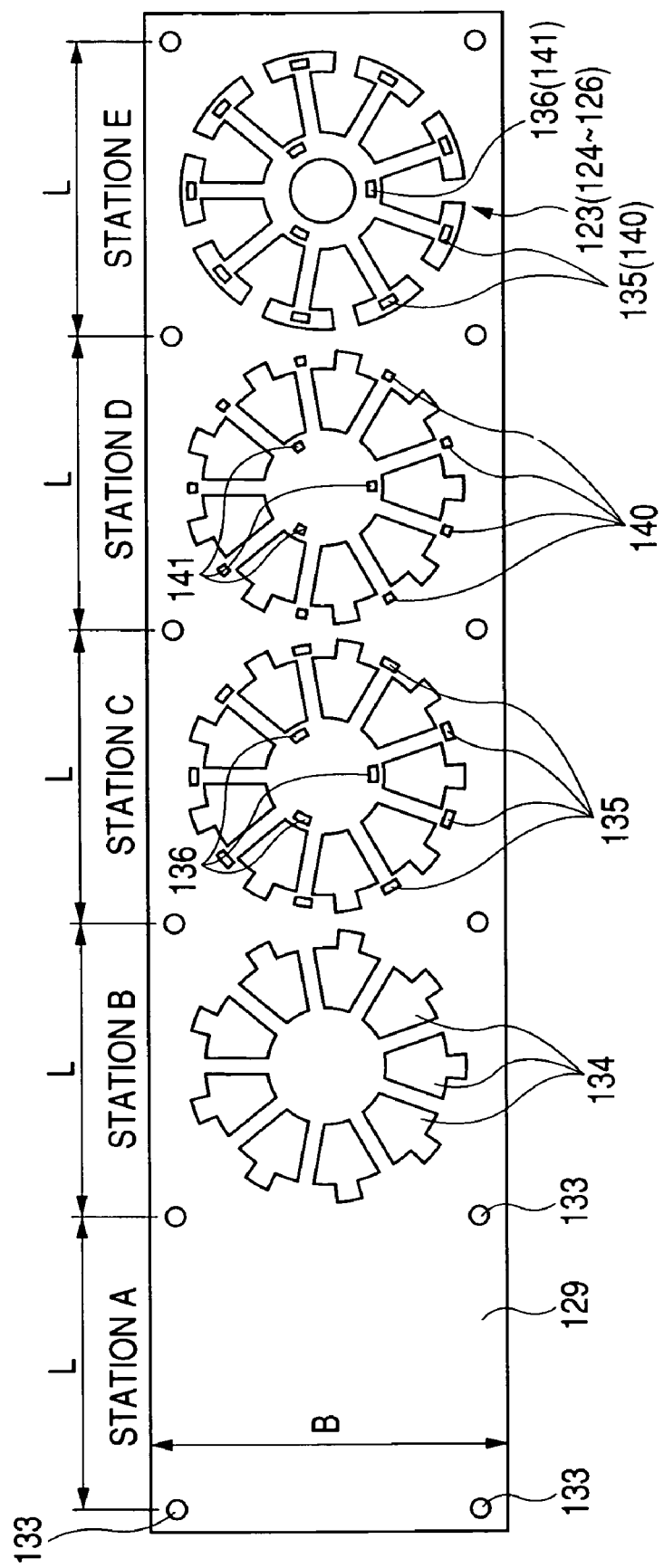
FIG. 20 is the view of explaining the pressing process for making the rotor core of FIG. 19.

FIG. 20 is a view of explaining the press processing procedure of making the rotor iron core of motor depending on the metal plate of laminated heterogeneous materials shown in FIG. 19.

Figure 23:
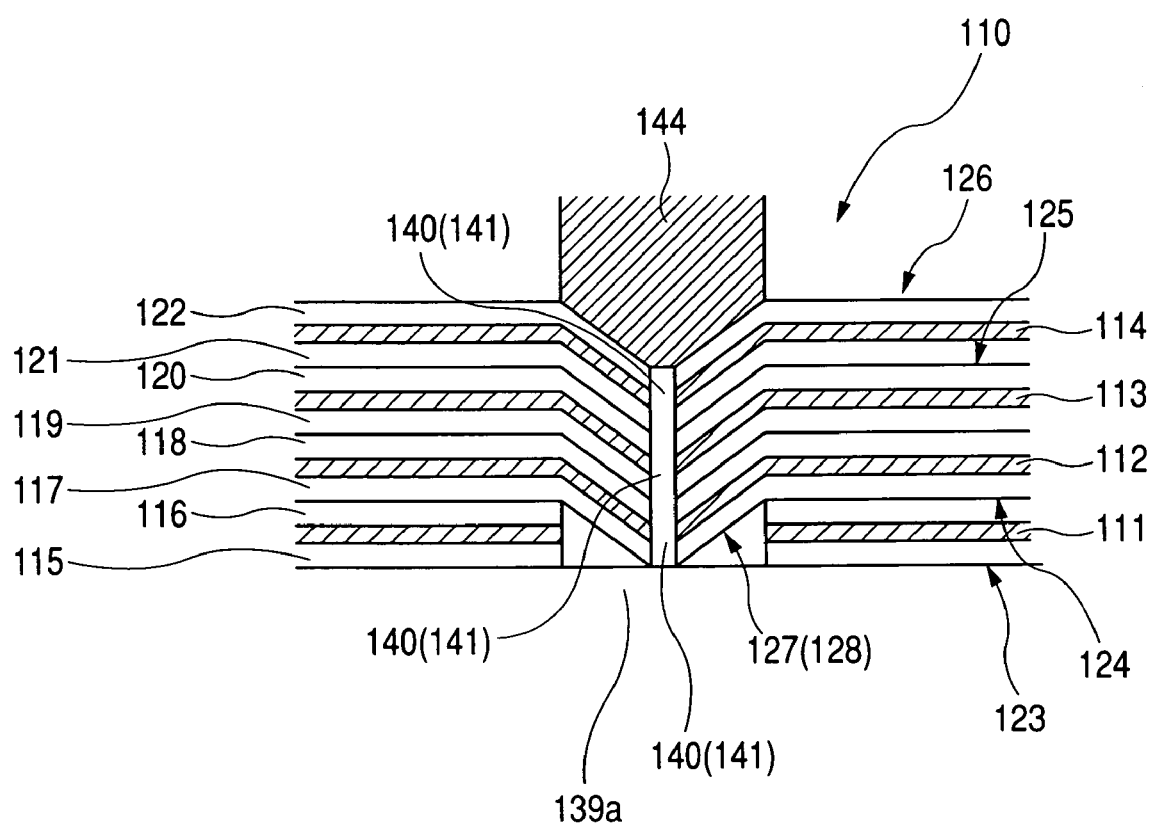
FIG. 23 is the view of explaining the caulk by a caulking punch to the rotor iron core.

As shown in FIGS. 19 and 23, the iron core 110 of laminated heterogeneous materials as the third embodiment according to the invention is caulked and laminated with the iron core pieces 123 to 126 of a first step (lowest layer) to a fourth step in such manners of holding the amorphous iron core pieces 111, 112, 113, 114 between the lower sides and upper sides of the iron core pieces of the electromagnetic steel plates 115-116, 117-118, 119-120, and 121-122, and is applied as the iron core of laminated rotors.

As shown in FIG. 19, in adjacency of the inside of the iron core 110 of laminated heterogeneous materials, inside caulking parts 127 are formed as one example of three pieces of caulking parts at positions divided equally in three parts in the circumference direction, while in adjacency of the outside of the iron core 110, outside caulking parts 128 are formed as one example of nine pieces of caulking parts at positions divided equally in nine parts in the circumference direction.

Details of the inside caulking part 127 and the outside caulking part 128 are as shown in FIG. 23.

The number and positions of the inside caulking part 127 and the outside caulking part 128 are not limited to this embodiment, but may be appropriately changed.

Figure 21:
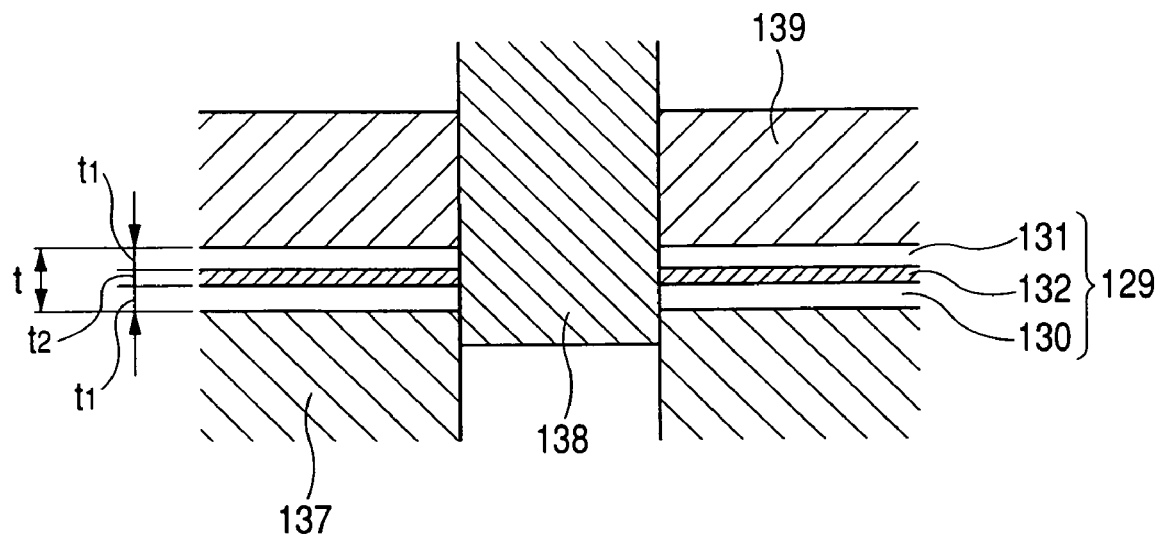
FIG. 21 is the view showing forming of an engaging hole with the iron core piece starting lamination in the pressing process for making the rotor iron core of the laminated heterogeneous materials of FIG. 19.

As shown in FIGS. 20 and 21, in the press processing procedures of making the iron core 110 of laminated heterogeneous materials, processing works in respective stations are explained as follows.

(Station A)

A long blank of the iron core piece (one example of a plate of laminated heterogeneous materials) 129 shown in FIG. 20 has thickness t rendered by laminating and holding, as shown in FIG. 21, the amorphous material 132 of thickness t2 (for example, 0.05 mm) between the electromagnetic steel plates 130, 131 of thickness t1, for example, being 0.18 mm, said electromagnetic steel plates 130, 131 being one examples of the lower and upper sided plate materials, and the amorphous material 132 being one example of the high magnetic material of workability being inferior to those of the electromagnetic steel plates 30, 31.

(Station B)

As shown in FIG. 20, slot holes 134 of a predetermined shape divided equally in nine parts are formed by punching around an axis hole (not shown).

(Station C)

As shown in FIGS. 20 and 21, outside of the iron core piece 123 of laminated heterogeneous materials of the first step, the engaging holes 135 are formed at the positions divided equally in nine parts in the circumference direction, and inside thereof, the engaging holes 136 are formed at the positions divided equally in three parts in the circumference direction, said iron core piece 123 [corresponding to the lower layer 1B of the metal plate of laminated heterogeneous materials (the second body of the metal plate of laminated heterogeneous materials) shown in FIGS. 2 and 4] becoming a lamination-starting iron core piece, and said engaging holes 136 (corresponding to the caulking hole km1 shown in FIG. 4) composing one side of the inside caulk parts 127, and the engaging holes 135 are formed, and the engaging holes 136 are formed, respectively by means of the die 137, the punch 138 and a stripper 139.

Figure 24:
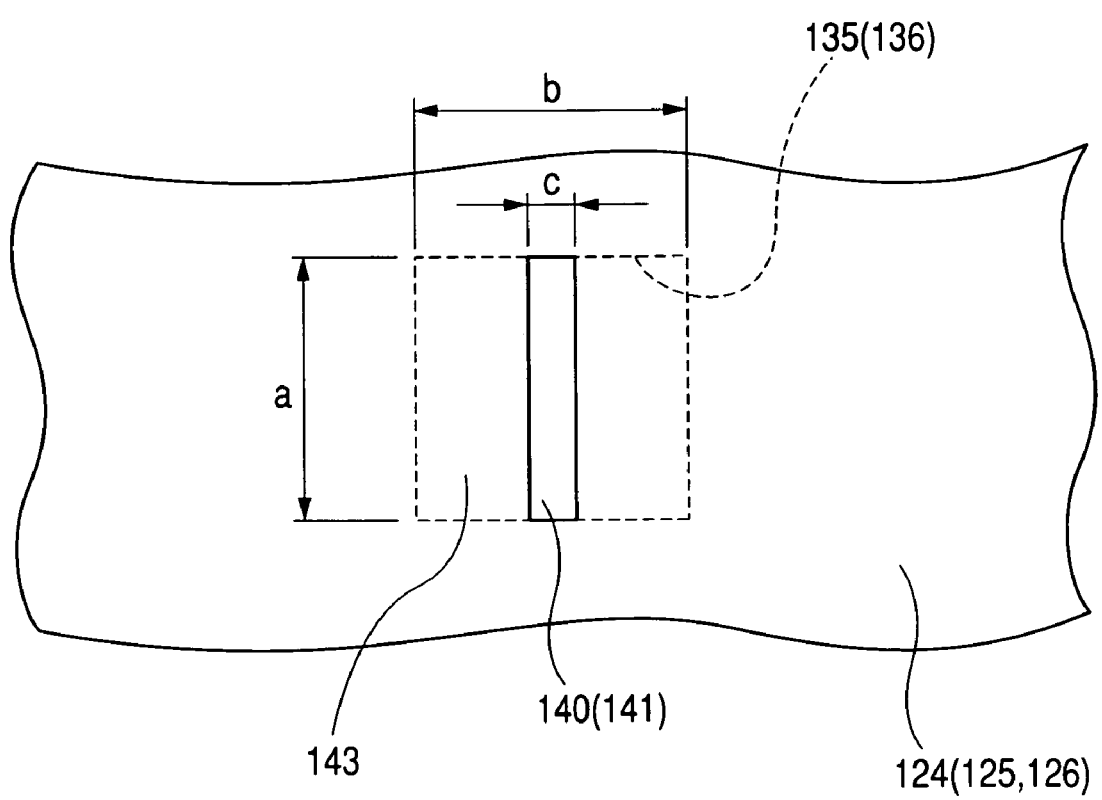
FIG. 24 is the plan view of the notching hole to be formed in a predetermined position in the caulking part.

The engaging holes 135, 136 are, as shown with dotted line in FIG. 24, formed to be rectangular seen from the plan view, and the length in the radius direction is a, and the length in the circumference direction is b.

(Station D)

Figure 22:
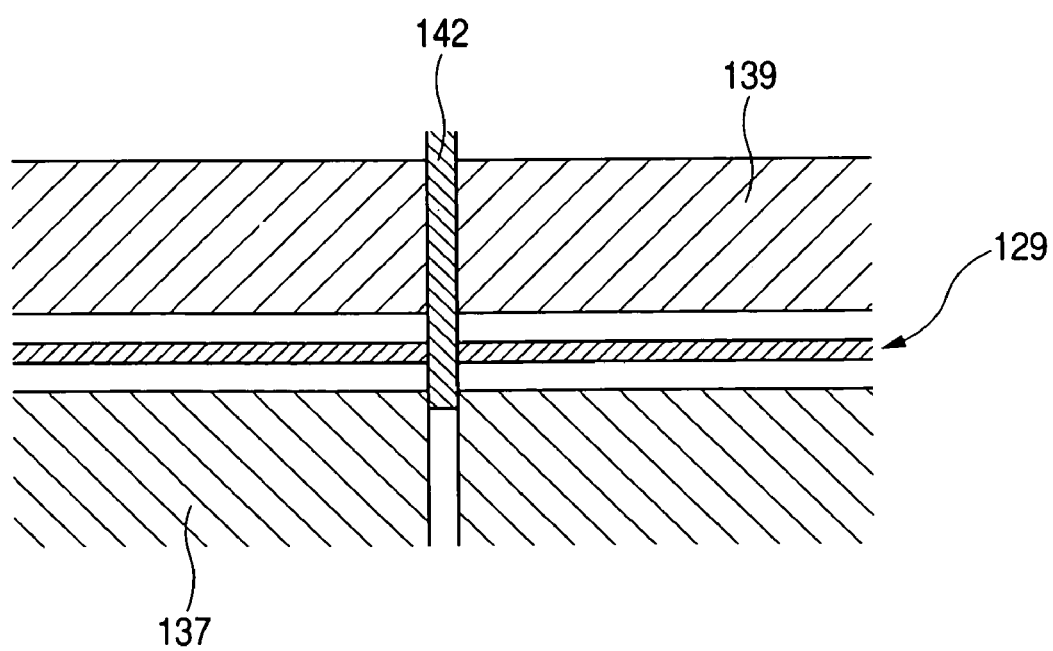
FIG. 22 is the view showing forming of a notching hole for caulking to the rotor iron core.

As shown in FIGS. 20, 22 and 24, the caulking holes 140, 141 in long rectangular shape are formed by reciprocally moving the punch 142 toward the die 137 at the intermediate positions in a predetermined position 143 of the caulking part of perpendicular position corresponding to the engaging holes 135, 136 of the iron core pieces 124 to 126 of laminated heterogeneous materials of the second to fourth steps to be successively laminated on the iron core piece 123 of laminated heterogeneous materials of the first step formed with the engaging holes 135, 136, said iron core pieces 124 to 126 [corresponding to the upper layer 1A of the metal of laminated heterogeneous materials shown in FIGS. 5 and 7 (first material body of the metal plate of laminated heterogeneous materials)], and said predetermined position (corresponding to the insides of the engaging holes 135, 136).

As to the size of the notched holes 140, 141, with respect to the center in the circumference direction of the engaging holes 135, 136, the width is c, and the length in the radius direction is a.

(Station E)

As shown in FIGS. 20 and 23, the blank 129 of the iron core piece formed with the engaging holes 135, 136 or the notched holes 140, 141 is punched into outer- and inner-configurations to make the iron core pieces 123 to 126 of laminated heterogeneous materials of the first to fourth steps, and the iron core pieces 123 to 126 of laminated heterogeneous materials of the first to fourth steps in order from the lowest core piece are laminated on a bed 139a.

At lamination, if cutting down the predetermined position 143 of the caulking parts of the iron core pieces 124 to 126 of laminated heterogeneous materials of the second to fourth steps by means of the punch 144, the lower side of the predetermined position 143 is formed at the lower side with V-shaped caulking projection in cross section having front ends of the notched holes 140, 141, and at the same time, the caulking projection of the iron core piece 124 of laminated heterogeneous materials of the second step is engaged with the engaging holes 135, 136 of the iron core piece 123 of laminated heterogeneous materials of the first step.

On the other hand, the caulking projections of the iron core pieces 125, 126 of the third and fourth steps are engaged with caulking concaves formed at the back sides of the caulking projections of the iron core pieces 124, 125 of the second and third steps.

In such manners, the respective caulking parts 127, 128 are caulked, and the rotor laminated iron core is provided as show in FIG. 19.

By the way, in this embodiment, the iron core pieces of laminated heterogeneous materials have the laminated layers of the four step, but the layer number is not limited to four, and the iron core pieces may be arbitrarily laminated until a desired thickness.

When cutting down the caulking punch, both sides of the predetermined position 143 of the caulking part is deeply cut down around the notched holes 140, 141 formed at the intermediate position in the circumference direction of the predetermined position 143 of the iron core pieces 124 to 126 of laminated heterogeneous materials of the second to fourth steps, whereby a caulking catch is formed to be long (corresponding to the thickness t of the iron core piece 123 of laminated heterogeneous materials of the first step in the case of FIG. 23), and further since the notching holes 140, 141 are formed, when cutting down both sides of the predetermined position 43 of the caulking part, the plate thickness and the width becoming the caulking projection are not reduced in size, so that the iron core piece 10 of laminated heterogeneous materials of strong caulking strength is produced.

Figure 25:
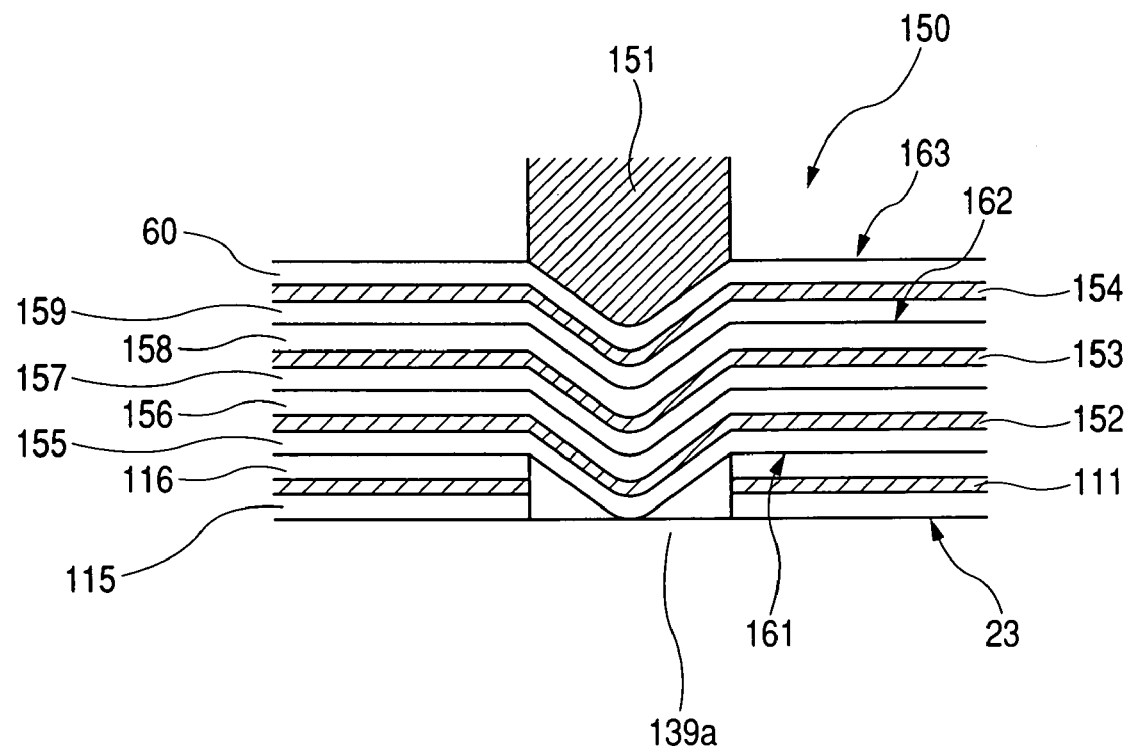
FIG. 25 is the view of explaining another caulk of caulking the iron core of laminated heterogeneous materials according to the invention.

FIG. 25 shows the caulked condition by the caulking punch 151 in the press processing procedure of producing the iron core 150 of laminated heterogeneous materials concerned with the other embodiment according to the invention.

Figure 26:
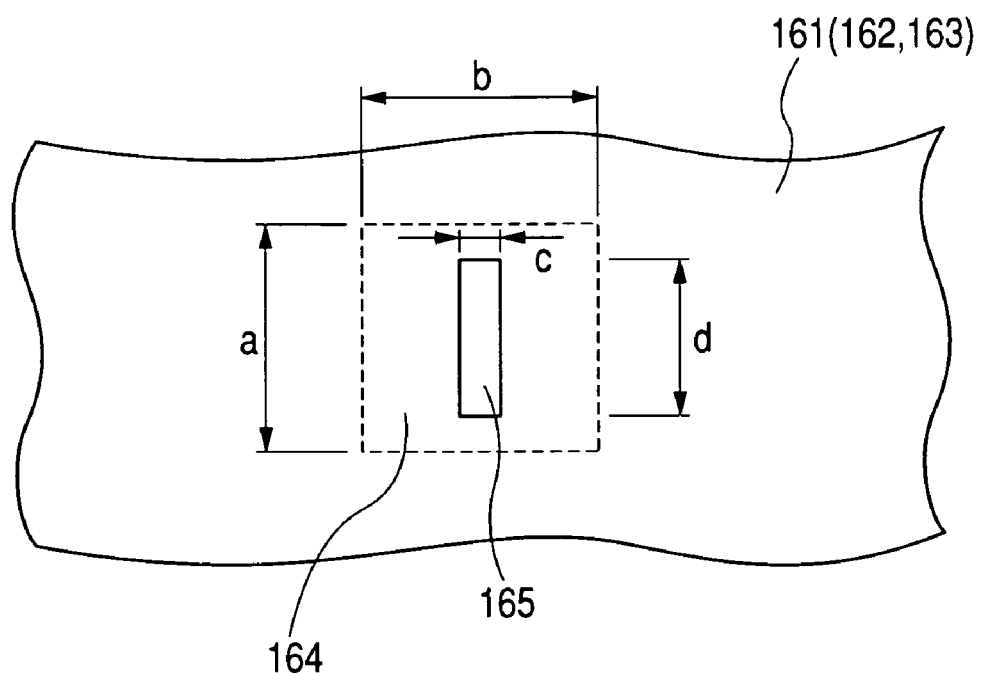
FIG. 26 is the plan view of the notching hole formed in the predetermined position of the caulking part.

The iron core 150 of laminated heterogeneous materials is different from the iron core 110 only in a length d of the notched hole 165 as shown in FIG. 26.

The same composing elements as those of the iron core 10 of laminated heterogeneous materials are given the same numerals to omit an explanation.

FIG. 26 shows the notched hole 165 formed in the intermediate position of the predetermined position 164 of the caulking parts of the iron core pieces 161 to 163 of laminated heterogeneous materials of the second to fourth steps, and the notched hole 165 leaves both ends (length of each end is (a–d)/2) in the radius direction of the predetermined position 164 of the caulk part, and the length d in the radius direction is shorter than the length a.

With such a structure, since the bottom of the caulk cut-down part is connected at both sides, strength of the caulking part is heightened by this amount, and in turn the caulking strength is increased.

Numerals 152, 153, 154 designate the amorphous iron core pieces, and numerals 155 and 156, 157 and 158, 159 and 160 are respectively the iron core pieces of the lower and upper sides electromagnetic steel plates.

Figure 27:
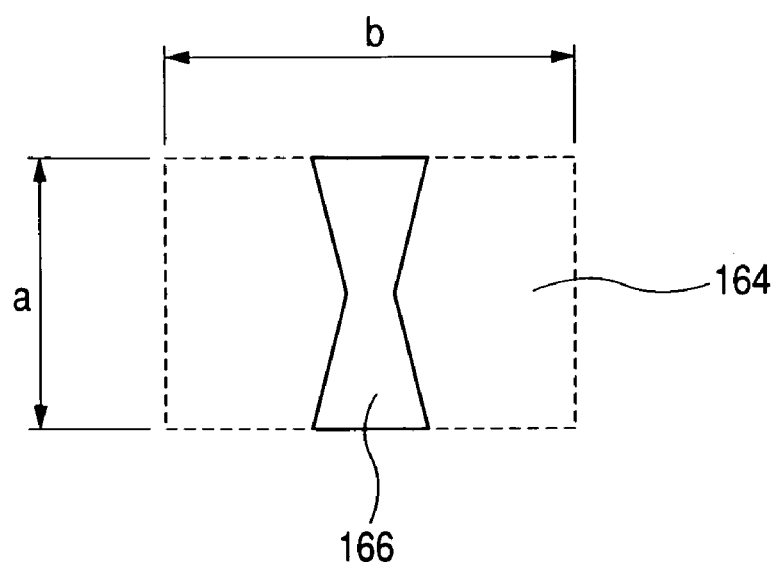
FIG. 27 is the view showing a first modified example of the notching hole to be formed in the predetermined position of the caulking part.
Figure 28:
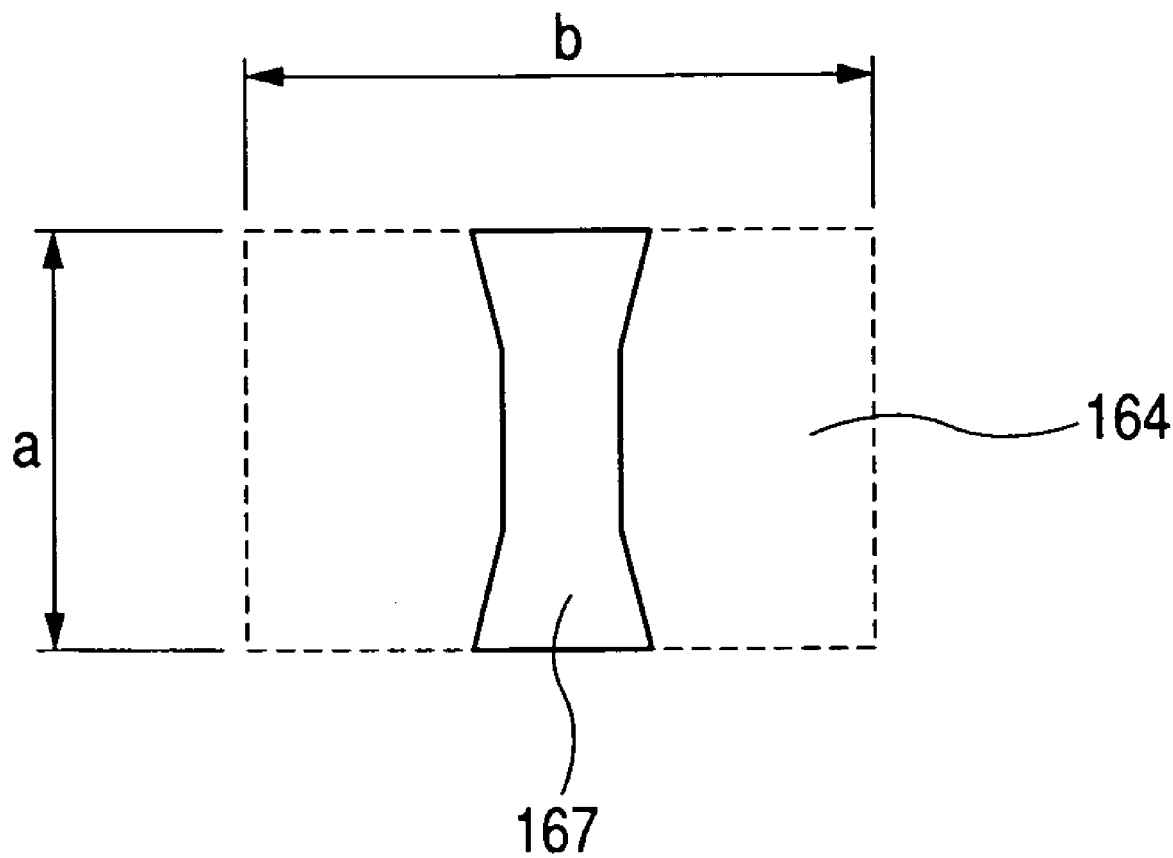
FIG. 28 is the view showing a second modified example of the notching hole to be formed in the predetermined position of the caulking part.
Figure 29:
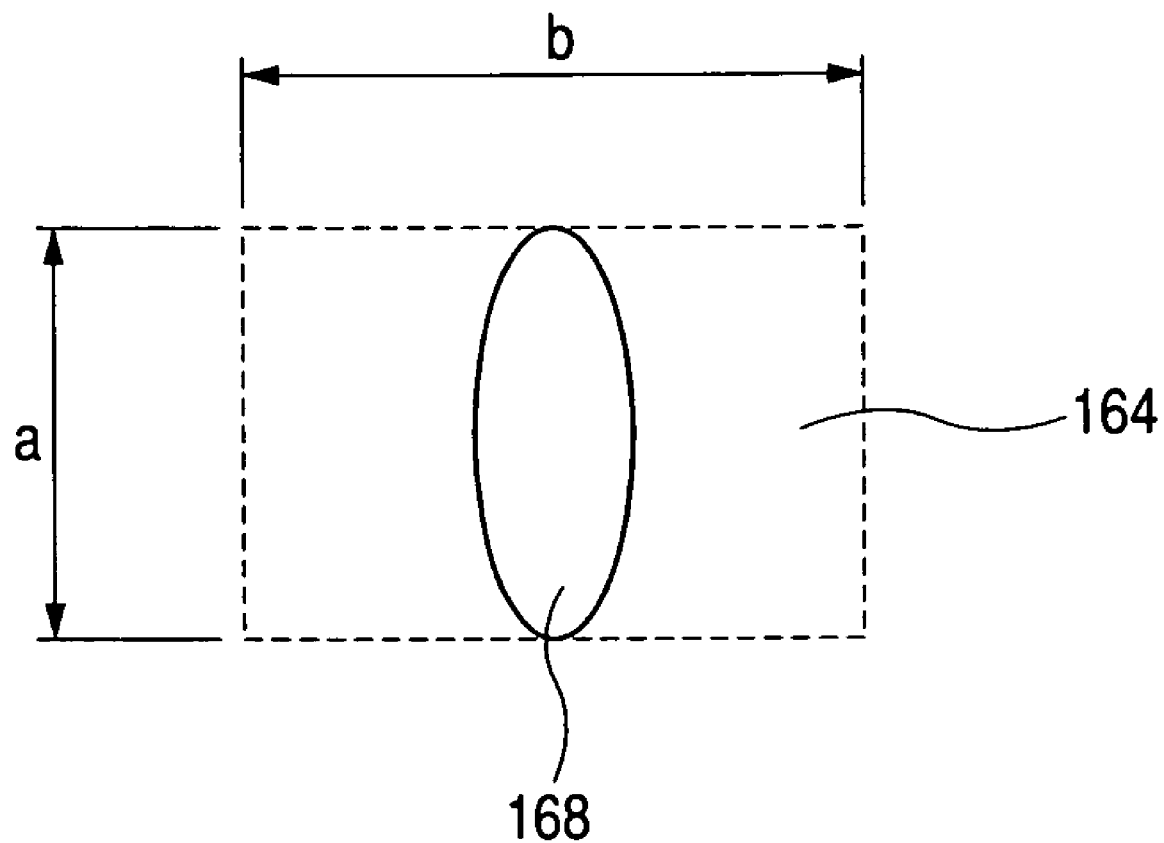
FIG. 29 is the view showing a third modified example of the notching hole to be formed in the predetermined position of the caulking part.

FIGS. 27, 28 and 29 show notched holes 166, 167, 168 of modified examples formed in the intermediate position of the predetermined position 164 of the caulk part.

In regard to the rectangular notch hole 165, the notched hole 166 has a drum shape, the notched hole 167 expands end parts, and the notched hole 168 is oval.

These notched holes have effects of deeply cutting down the caulking projection similarly to the rectangular notch hole 165, and further, the notched holes 166 to 168 also have effects of lightening the cutting down force by the caulking punch 151.

The present invention is not limited to the above mentioned embodiments, and so far as not altering the subject matter of the invention, any modifications are available, for example, the invention may be applied to the above mentioned embodiments, or cases of composing the iron cores of laminated heterogeneous materials according to the invention by combining parts or all of the modified examples.

In the third embodiment, the iron cores of laminated rotors have been stated, but no limit is made thereto, and this embodiment may be applied to laminated iron cores of a stator or a transformer.

The heterogeneous material is the amorphous material of high magnetic material of hard workability being poor in formability, but no limit is made thereto, but a high Si electromagnetic steel plate exceeding 3% Si of hard workability may be employed.

Figure 30:
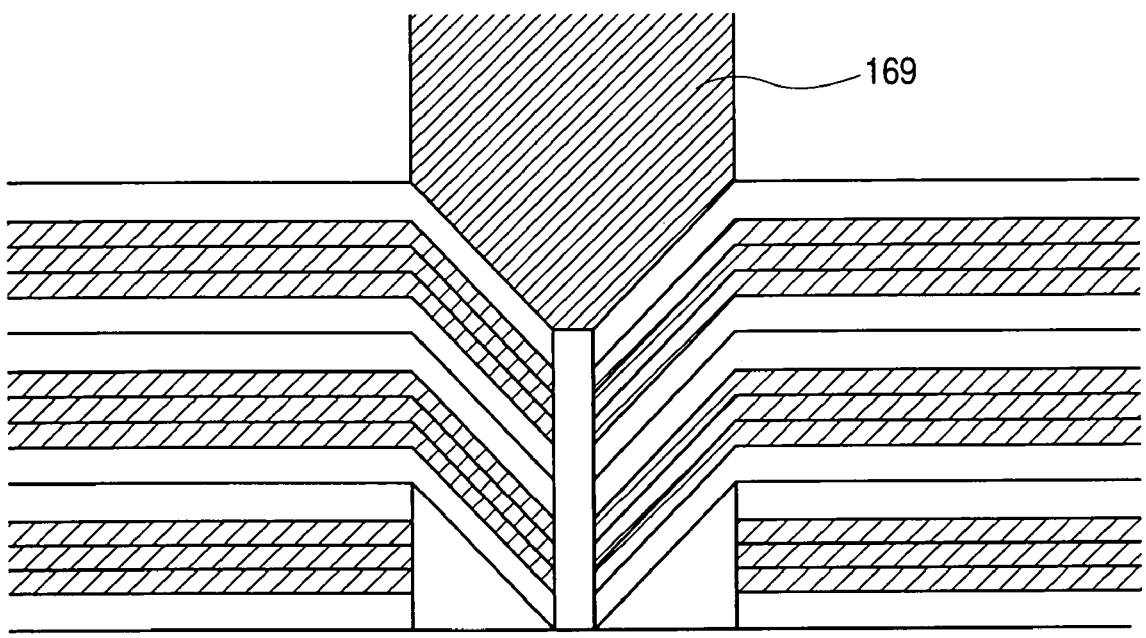
FIG. 30 is the view of explaining the caulk by the caulking punch during the pressing process of making the iron core of laminated heterogeneous materials of the modified example.

The iron core pieces of laminated heterogeneous materials have the three layers of holding one sheet of the heterogeneous material between the two sheets of upper and lower electromagnetic steel plates, but no limit is made thereto, and as cases may be, it is possible to hold one sheet of the heterogeneous material between three or more sheets of plate materials. As shown in FIG. 30, it is also possible to hold two or more sheets of the heterogeneous materials (three sheets of amorphous iron core pieces in FIG. 30) between the upper and lower plate materials so as to compose four or more layers.

Numeral 169 of FIG. 30 designates the punch.

By the way, as the plate material, the electromagnetic steel plate is used, but no limit is made thereto, and if needed, for making the caulking part easy to form and for lowering cost, magnetism is more heightened in the low carbon steel plate or the electromagnetic soft iron plate, and for increasing corrosion resistance, Fe—Ni alloy plate or the caulking part are made easy to form, and if resistance of a conductor is required to increase, the copper plate may be used.

An aluminum plate or other metal plates of good workability may be used.

INDUSTRIAL APPLICABILITY

In the metal plate of laminated heterogeneous materials and the iron core of the same, for laminating to join a plurality of metal plates of different material qualities, a first material body of the metal plate of the laminated heterogeneous materials having notches at intermediate parts thereof, as well as caulking projections formed by cutting down rows of both ends thereof in the length direction of the notches, a second material body of the metal plate of the laminated heterogeneous materials formed with caulking holes for inserting the caulking projections, are joined by caulking at the caulking projections of said first material body of the metal plate of laminated heterogeneous materials and the caulking holes of the second material body of the metal plate of the laminated heterogeneous materials.

Further, the first and second bodies of the metal materials of laminated heterogeneous materials are laminated with the metal plate of harder workability than that of at least one of the lower and the upper sided metal plates, thereby to stably and easily process to form notches or caulked holes in a sole metal plate of hard workability.

It is noted that the present invention is not limited to the above mentioned embodiments.

The invention claimed is:

1. An iron core of laminated heterogeneous materials, wherein iron core pieces each made of laminated heterogeneous materials are laminated to form a desired thickness using caulking parts, said iron core pieces being punched from plates of laminated heterogeneous materials formed by holding high magnetic materials of hard workability between lower and upper sided plate materials with better workability than the high magnetic materials, and said caulking parts having notching holes therethrough at a center thereof, the notching holes having a length, the caulking parts having spaced sides extending in a length direction with respect to the notching holes, and each being formed by cutting down both sides in the length direction of the notching holes.

2. An iron core of laminated heterogeneous materials as set forth in claim 1, wherein the iron core comprises an iron core piece defining a lowermost layer comprising laminated heterogeneous materials, the lowermost layer having caulking parts comprising catching holes, and caulking projections and caulking concaves formed in one iron core piece of laminated heterogeneous materials laminated on the iron core piece defining said lowermost layer, and the caulking projections and the caulking concaves on the one iron core piece are formed by cutting down both sides in the length direction of the notching holes formed to an intermediate position on predetermined parts to be caulked at said catching holes.

3. An iron core of laminated heterogeneous materials as set forth in claim 2, wherein the notching holes are formed up to edges of the predetermined parts to be caulked.

4. An iron core of laminated heterogeneous materials as set forth in claim 2, wherein the notching holes are formed, leaving end parts of a desired length up to edges of the predetermined parts to be caulked.

5. An iron core of laminated heterogeneous materials as set forth in claim 2, wherein the high magnetic material of hard workability comprises an amorphous plate.

6. An iron core of laminated heterogeneous materials as set forth in claim 3, wherein the high magnetic material of hard workability comprises an amorphous plate.

7. An iron core of laminated heterogeneous materials as set forth in claim 1, wherein the notching holes are formed up to edges of the predetermined parts to be caulked.

8. An iron core of laminated heterogeneous materials as set forth in claim 7, wherein the high magnetic material of hard workability comprises an amorphous plate.

9. An iron core of laminated heterogeneous materials as set forth in claim 4, wherein the high magnetic material of hard workability comprises an amorphous plate.

10. An iron core of laminated heterogeneous materials as set forth in claim 1, wherein the notching holes are formed, leaving end parts of a desired length up to edges of the predetermined parts to be caulked.

11. An iron core of laminated heterogeneous materials as set forth in claim 10, wherein the high magnetic material of hard workability comprises an amorphous plate.

12. An iron core of laminated heterogeneous materials as set forth in claim 1, wherein the high magnetic material of hard workability comprises an amorphous plate.

13. An iron core of laminated heterogeneous materials as set forth in any one of claims 1 to 12, or 3 to 9, wherein the plate material comprises one of electromagnetic steel plate, low carbon steel plate, electromagnetic soft iron plate, Fe—Ni alloy plate, or copper plate.

14. An iron core of laminated heterogeneous materials as set forth in claim 1 wherein the spaced sides are straight and extend substantially parallel to each other.

15. An iron core of laminated materials, the iron core comprising:
    an upper iron core piece comprising heterogeneous plate materials laminated using caulking parts,
    the upper iron piece comprising a high magnetic plate material between upper and lower plate materials having better workability than the high magnetic plate material,
    the caulking parts each having an associated notching hole therethrough at a center,
    the notching holes each having a length,
    the caulking parts each having spaced sides extending generally parallel to each other in a length direction of an associated notching hole.

16. The iron core of laminated materials according to claim 15 wherein the iron core comprises an iron core piece comprising laminated heterogeneous materials defining a lower layer having catching holes, the upper iron core piece comprising caulking projections and caulking concaves each formed by cutting down both sides of the caulking parts in the length direction of the notching holes to a location within the catching holes.

* * * * *